United States Patent
Qiao et al.

(10) Patent No.: US 11,690,007 B2
(45) Date of Patent: *Jun. 27, 2023

(54) RESTRICTED SERVICE TYPE FOR RESTRICTED LOCAL OPERATOR SERVICES IN A WIRELESS NETWORK

(71) Applicant: Ofinno, LLC, Reston, VA (US)

(72) Inventors: Weihua Qiao, Herndon, VA (US); Esmael Hejazi Dinan, McLean, VA (US); Kyungmin Park, Vienna, VA (US); Peyman Talebi Fard, Vienna, VA (US)

(73) Assignee: Ofinno, LLC, Reston, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/538,729

(22) Filed: Nov. 30, 2021

(65) Prior Publication Data

US 2022/0086748 A1 Mar. 17, 2022

Related U.S. Application Data

(63) Continuation of application No. 17/033,098, filed on Sep. 25, 2020, now Pat. No. 11,197,239, which is a
(Continued)

(51) Int. Cl.
| | |
|---|---|
| *H04W 48/18* | (2009.01) |
| *H04W 76/27* | (2018.01) |
| *H04W 8/18* | (2009.01) |
| *H04W 80/02* | (2009.01) |
| *H04W 8/08* | (2009.01) |
| *H04W 48/16* | (2009.01) |

(52) U.S. Cl.
CPC .......... *H04W 48/18* (2013.01); *H04W 8/08* (2013.01); *H04W 8/18* (2013.01); *H04W 48/16* (2013.01); *H04W 76/27* (2018.02); *H04W 80/02* (2013.01)

(58) Field of Classification Search
CPC ......... H04W 48/18; H04W 8/08; H04W 8/18; H04W 48/16
See application file for complete search history.

(56) References Cited

U.S. PATENT DOCUMENTS 10,506,506 B2 12/2019 Qiao
10,944,796 B2 * 3/2021 Verma ............... H04L 63/1416
(Continued)

OTHER PUBLICATIONS

3GPP TR 22.820 V15.0.0 (Mar. 2017); Technical Report; 3rd Generation Partnership Project; Technical Specification Group Services and System Aspects; Study on Provision of Access to Restricted Local Operator Services by Unauthentica.
(Continued)

*Primary Examiner* — Barry W Taylor
(74) *Attorney, Agent, or Firm* — Peter Flanagan; Kavon Nasabzadeh; Philip R. Smith

(57) ABSTRACT

A session management function (SMF) sends, to a policy control function (PCF), a policy request comprising a first parameter indicating a restricted service type for restricted local operator services (RLOS) and a second parameter indicating a network slice selection assistance information (NSSAI) for the RLOS. The SMF receives, from the PCF, a policy response comprising a policy and charging rule for the RLOS.

20 Claims, 30 Drawing Sheets

Related U.S. Application Data continuation of application No. 16/707,258, filed on Dec. 9, 2019, now Pat. No. 10,791,509, which is a continuation of application No. 16/387,321, filed on Apr. 17, 2019, now Pat. No. 10,506,506.

(60) Provisional application No. 62/664,533, filed on Apr. 30, 2018.

(56) References Cited

U.S. PATENT DOCUMENTS

| | | | |
|---|---|---|---|
| 2018/0270744 A1 | 9/2018 | Griot et al. | |
| 2018/0368061 A1 | 12/2018 | Yu et al. | |
| 2019/0044980 A1 | 2/2019 | Russell et al. | |
| 2019/0053308 A1 | 2/2019 | Castellanos Zamora et al. | |
| 2019/0053328 A1 | 2/2019 | Kunz et al. | |
| 2019/0141606 A1 | 5/2019 | Qiao et al. | |
| 2019/0174449 A1 | 6/2019 | Shan et al. | |
| 2019/0182718 A1 | 6/2019 | Shan | |
| 2019/0230556 A1 | 7/2019 | Lee | |
| 2020/0359440 A1* | 11/2020 | Qiao | H04W 40/246 |
| 2021/0144590 A1* | 5/2021 | Li | H04W 76/11 |
| 2021/0184875 A1* | 6/2021 | Qiao | H04W 76/11 |

OTHER PUBLICATIONS

3GPP TR 23.715 V0.3.0 (Mar. 2018); Technical Report; 3rd Generation Partnership Project; Technical Specification Group Services and System Aspects; Study on System enhancements for Provision of Access to Restricted Local Operator S.

3GPP TSG-SA WG1 Meeting #81 S1-180522; Fukuoka, Japan, Feb. 5-9, 2018 (revision of S1-180474).

S2-180083; SA WG2 Meeting #S2-125S2-180083; Jan. 22-26, 2018, Gothenburg, Sweden(revision of S2-18XXXX); Source:Ericsson; Title:Update to Architectural Assumptions; Document for:Discussion/Approval.

S2-180086; SA WG2 Meeting #S2-125S2-180086; Jan. 22-26, 2018, Gothenburg, Sweden(revision of S2-18XXXX); Source:Ericsson; Title:Removal of Key issue EPC#5; Document for:Discussion/Approval.

S2-180087; SA WG2 Meeting #S2-125S2-180087; Jan. 22-26, 2018, Gothenburg, Sweden(revision of S2-18XXXX); Source:Ericsson; Title:Solution to Key issue #EPC-1; Document for:Discussion/Approval.

S2-180088; SA WG2 Meeting #S2-125S2-180088; Jan. 22-26, 2018, Gothenburg, Sweden(revision of S2-18XXXX); Source:Ericsson; Title:Solution to Key issue #EPC-3 and #EPC-4; Document for:Discussion/Approval.

S2-180089; SA WG2 Meeting #S2-125S2-180089; Jan. 22-26, 2018, Gothenburg, Sweden(revision of S2-18XXXX); Source:Ericsson ; Title:Solution to Key issue IMS-1, IMS-2, and IMS-3; Document for:Discussion/Approval.

S2-180389_PaRLOS-solution-r2; SA WG2 Meeting #12552-180389; Jan. 22-26, 2018, Gothenburg, Sweden(was S2-18xxxx); Source:Qualcomm Incorporated; Title:Solution for Restricted IMS Local Operator Services; Document for: Discussion/Approval.

S2-180463_pCR23715 RLOS sol EPC procedures_v2; SA WG2 Meeting #125S2-180463; Jan. 22-26, 2018, Gothenburg, Sweden(revision of S2-18xxxx); Source:Nokia, Nokia Shanghai Bell, Verizon; Title:23.715: Solution: EPC procedures for RLOS; Document for:Approval.

S2-180464_pCR23715 RLOS sol IMS procedures_v2; SA WG2 Meeting #12532-180464; Jan. 22-26, 2018, Gothenburg, Sweden(revision of S2-18xxxx); Source:Nokia, Nokia Shanghai Bell, Verizon; Title:23.715: Solution: IMS procedures for RLOS; Document for:Approval.

S2-180759_Parlos_Solution_KI_EPC-1+2_v02; SA WG2 Meeting #12532-180759; Jan. 22-26, 2018, Gothenburg, Sweden(revision of S2-17xxxx); Source: Motorola Mobility, Lenovo; Title:Solution for initial RLOS access; Document for:Approval.

S2-181001 was0461_pCR23715 RLOS assumptions update_v1; SA WG2 Meeting #12532-181001 Jan. 22-26, 2018, Gothenburg, Sweden(revision of S2-180461); Source:Nokia, Nokia Shanghai Bell, Verizon; Title:Update of RLOS architectural assumptions; Document for:Approval.

S2-181002; SA WG2 Meeting #S2-125 S2-181002; Jan. 22-26, 2018; Gothenburg, Sweden (revision of S2-18XX84); Source: Ericsson; Title: Update to Key issue IMS#1; Document for: Discussion/Approval.

S2-181003; SA WG2 Meeting #S2-125 S2-181003; Jan. 22-26, 2018; Gothenburg, Sweden (revision of S2-18XX85); Source: Ericsson; Title: Update to Key issue EPC#3; Document for: Discussion/Approval.

S2-181044 was1004 was0462_pCR23715 RLOS key issues update_v1; SA WG2 Meeting #12532-181044 Jan. 22 - 26, 2018, Gothenburg, Sweden(revision of S2-181044); Source:Nokia, Nokia Shanghai Bell, Verizon; Title:Update of RLOS key issues; Document for:Approval.

S2-181407_e-mail_rev5_S2-181045; SA WG2 Meeting #125S2-181407; Jan. 22-26, 2018, Gothenburg, Sweden(e-mail revision 5 of 32-181045); Title:Reply LS on clarification on Restricted Operator Services; Reply to:Reply LS on clarification on Restricted Operator Services (S2-180043/S1-174604); Release.

S2-181450 S3-180347; SA WG2 Meeting #S2-126S2-181450; Feb. 26-Mar. 2, 2018, Montreal, Canada; 3GPP TSG-SA WG3 Meeting #90 Tdoc S3-180347; Gothenburg (Sweden) Jan. 22-26, 2018.

S2-181707; SA WG2 Meeting #S2-126 S2-181707; Feb. 26-Mar. 2, 2018; Montreal, Canada (revision of S2-18XXXX); Source: Ericsson; Title: Solution to Key issue #EPC-1; Document for: Discussion/Approval.

S2-181708; SA WG2 Meeting #S2-126 S2-181708; Feb. 26-Mar. 2, 2018; Montreal, Canada (revision of S2-18XXXX); Source: Ericsson; Title: Solution to Key issue #EPC-3 and #EPC-4; Document for: Discussion/Approva.l.

S2-181709; SA WG2 Meeting #S2-126 S2-181709; Feb. 26-Mar. 2, 2018; Montreal, Canada (revision of S2-18XXXX); Source: Ericsson; Title: Solution to Key issue IMS-1, IMS-2, and IMS-3; Document for: Discussion/Approval.

S2-181729; pCR23715 RLOS sol IMS procedures_v1; SA WG2 Meeting #126S2-181729; Feb. 26-Mar. 2, 2018, Montreal, Canada(revision of S2-18xxxx); Source:Nokia, Nokia Shanghai Bell, Verizon; Title: 23.715: Solution: IMS procedures for RLOS; Document for:Approval.

S2-181799;PARLOS_solution-key-issue6-EPC_charginginfo_collect; 3GPP SA WG2 Meeting SA2#126 S2-181799; Feb. 26-Mar. 2, 2018; Montreal, Canada (revision of S2-18XXXX); Source: Ericsson; Title: Solution to Key Issue #EPC-6 Collection of charging information; Document for: Discussion/Approval.

S2-182115; parlos_solution_ki_epc#4; SA WG2 Meeting #126S2-182115; Feb. 26-Mar. 26, 2018, Montreal, Canada; ; Source:Samsung; Title:Solution for EPC#4 Support of authenticated UEs; Document for:Approval.

S2-182136; S1-180602; SA WG2 Meeting #S2-126S2-182136;Feb. 26-Mar. 2, 2018, Montreal, Canada; 3GPP TSG-SA WG1 Meeting #81 S1-180602; Fukuoka, Japan, Feb. 5-9, 2018(revision of S1-180524, S1-180473, S1-180279).

S2-182192; SA WG2 Meeting #125S2-182192; Jan. 22-26, 2018, Gothenburg, Sweden(revision of S2-17xxxx); Source:NEC Corporation; Title:Solution for RLOS attach procedure.; Document for:Approval.

S2-182274;Parios_Solution_KI_EPC-1+2_v02; SA WG2 Meeting #125S2-182274;Feb. 26-Mar. 2, 2018, Montreal, Canada(revision of S2-17xxxx); Source:Motorola Mobility, Lenovo; Title:Solution for initial RLOS access; Document for:Approval.

S2-182508 was 1726_pCR23715 RLOS architectural assumptions update_v1; SA WG2 Meeting #126S2-182508 Feb. 26-Mar. 2, 2018, Montreal, Canada(revision of S2-181726); Source: Nokia, Nokia Shanghai Bell; Title: Update of RLOS architectural assumptions; Document for:Approval.

S2-182510; PaRLOS-solution-r7; SA WG2 Meeting #126S2-182510; Feb. 26-Mar. 2018, Montreal, Canada(was S2-180389); Source:Qualcomm Incorporated; Title:Solution for Restricted IMS Local Operator Services; Document for: Discussion/Approval.

(56) References Cited

OTHER PUBLICATIONS

S2-182511 was 1728_pCR23715 RLOS sol EPC procedures_v2; SA WG2 Meeting #126S2-182511;Feb. 26-Mar. 2, 2018, Montreal, Canada(revision of S2-181728); Source:Nokia, Nokia Shanghai Bell, Verizon; Title:23.715: Solution: EPC procedures for RLOS; Document for:Approval.

S2-182888 was 2509 was 1727_pCR23715 RLOS key issues update_v0.2; SA WG2 Meeting #12682-182888 Feb. 26-Mar. 2, 2018, Montreal, Canada(revision of S2-182509); Source:Nokia, Nokia Shanghai Bell; Title: Update of RLOS key issues; Document for:Approval.

SP-180116_S2-182753_Revised SID_Parlos_cl; 3GPP TSG SA Meeting #79TD SP-170116 Mar. 21-23, 2018, Chennai, India(Update of SP-170382); SA WG2 Meeting #126 S2-182753; Feb. 26-Mar. 2, 2018, Montreal, Canada; Source:SA WG2; Title:Revised SID: Study on System enhancements for Provision of Access to Restricted.

SP-180116_SP-170382_Revised SID_Parlos_rm; 3GPP TSG SA Meeting #79TD SP-170116 Mar. 21-23, 2018, Chennai, India(Update of SP-170382); SA WG2 Meeting #126 S2-182753; Feb. 26-Mar. 2, 2018, Montreal, Canada; Source:SA WG2; Title:Revised SID: Study on System enhancements for Provision of Access to Restricted.

3GPP TSG-SA WG1 Meeting #81 S1-180601; Fukuoka, Japan, Feb. 5-9, 2018 (revision of S1-180523, S1-180475).

SA WG2 Meeting #S2-127 S2-183077; Apr. 16-20, 2018, Sanya, P.R. China.

* cited by examiner

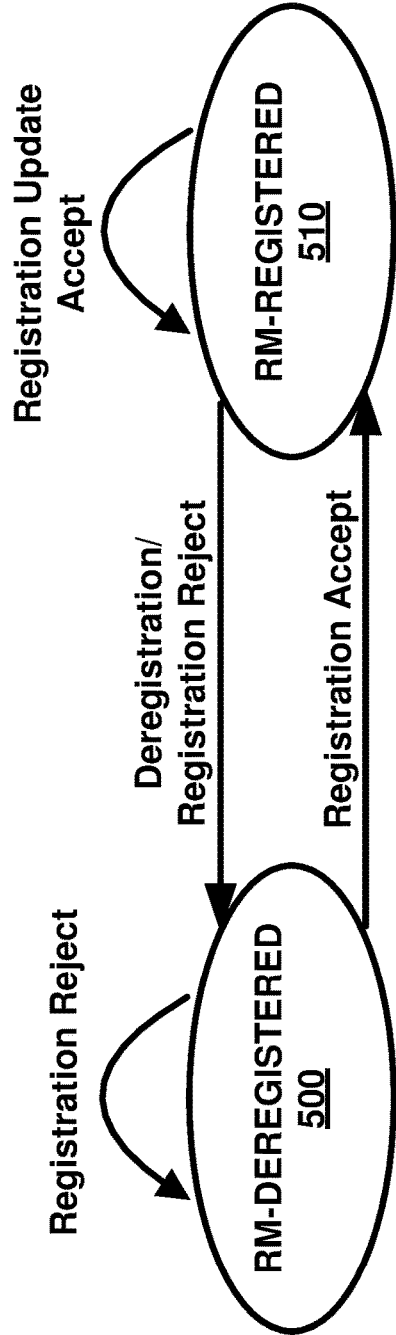
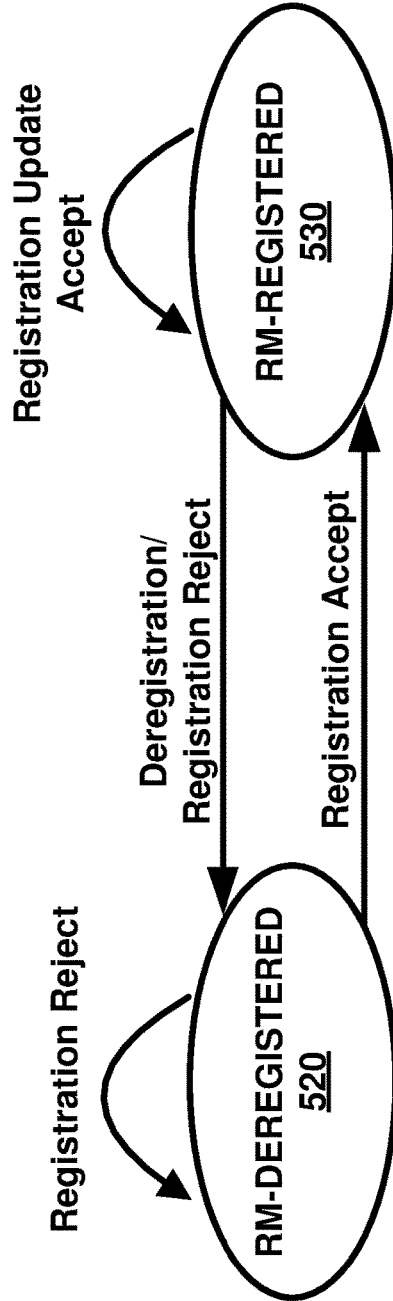
FIG. 5A
FIG. 5B

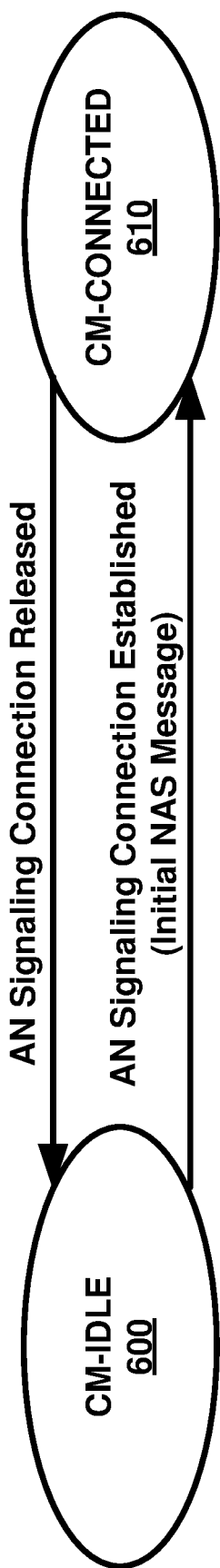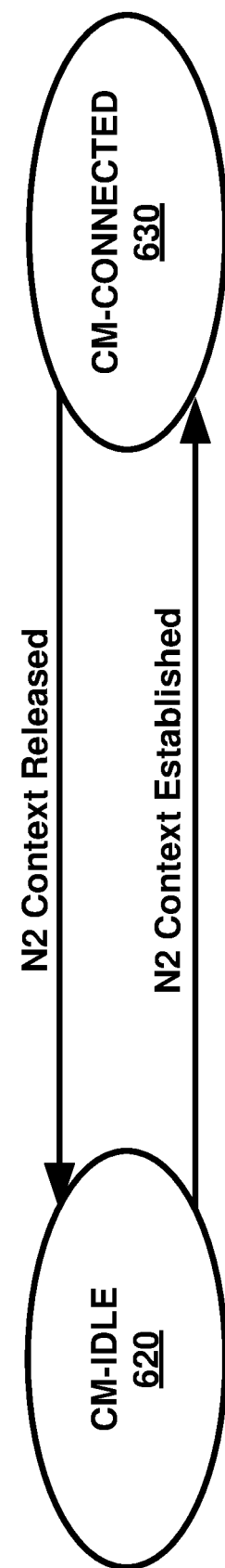

Send, by a wireless device to a base station, a 1st RRC message comprising a registration request message for an AMF, where the registration request message comprises: a 1st parameter indicating a request for RLOS; and a 2nd parameter indicating a requested NSSAI for the RLOS, where the requested NSSAI is 1st allowed NSSAI(s)
2410

Receive, by the wireless device from the base station, a 2nd RRC message comprising a registration accept message from the AMF, where the registration accept message comprises RLOS information and a 2nd allowed NSSAI for RLOS(s) allowed for the wireless device, the RLOS information comprises a service type of the RLOS(s) allowed for the wireless device
2420

Send, by the wireless device to the base station, packet(s) of the RLOS(s) allowed for the wireless device
2430

Determine, by the AMF, the 1st allowed NSSAI(s) for the RLOS based on the requested NSSAI received from the wireless device
2440

FIG. 24

Send, by a wireless device to a base station, a 1st RRC message comprising a registration request message for an AMF, where the registration request message comprises a parameter indicating a request for RLOS
2610

Receive, by the wireless device from the base station, a 2nd RRC message comprising a registration accept message from the AMF, where the registration accept message comprises RLOS information and an allowed PDU session type for the RLOS, the RLOS information indicating a service type of RLOS(s) allowed for the wireless device
2620

Initiate, by the wireless device and based on the RLOS information, a PDU session establishment procedure indicating the allowed PDU session type for the RLOS(s)
2630

FIG. 26

Receive, by an AMF) from a wireless device via a base station, a registration request message comprising: a 1st parameter indicating a request for RLOS; and a 2nd parameter indicating a requested NSSAI for the RLOS, where the requested NSSAI is a 1st allowed NSSAI(s)
2810

Determine, by the AMF and based on the request for the RLOS and the requested NSSAI for the RLOS, a 2nd allowed NSSAI for the RLOS
2820

Send, by the AMF to a PCF, a policy association establishment message for the wireless device comprising the 2nd allowed NSSAI)
2830

Receive, by the AMF from the PCF, a response message comprising: access and mobility management polic(ies) comprising an allowed PDU session type for the RLOS; and RLOS information
2840

Send, by the AMF to the wireless device, a registration accept message comprises the access and mobility management polic(ies) and the RLOS information
2850

FIG. 28

Receive, by a wireless device from a base station of a network, a system information block indicating that the network supports RLOS
2910

Send, by the wireless device to the base station, a RRC connection request message indicating a request for an RRC connection with the base station, where the RRC connection request message comprises an establishment cause indicating that the RRC connection is for the RLOS
2920

Receive, by the wireless device and in response to the RRC connection request message, an RRC connection setup message indicating an acceptance of the request for the RRC connection for the RLOS
2930

Send, by the wireless device, a 1st RRC message in response to the RRC connection setup message
2940

FIG. 29

```
┌─────────────────────────────────────────────────────────────┐
│  Receive, by a PCF from a NF, a 1st message comprising RLOS │
│  information, where the RLOS information comprises at least │
│  one of: a 1st information element indicating a service type│
│  of RLOS(s); or a 2nd information element indicating        │
│  application information associated with the service type   │
│                            3010                             │
└─────────────────────────────────────────────────────────────┘
                              │
                              ▼
┌─────────────────────────────────────────────────────────────┐
│  Receive, by the PCF from a SMF) a 2nd message indicating a │
│  policy establishment request for a wireless device, where  │
│  the policy establishment request comprises at least one of:│
│  a restricted service type for the RLOS(s); or an allowed   │
│  requested NSSAI for the RLOS(s)                            │
│                            3020                             │
└─────────────────────────────────────────────────────────────┘
                              │
                              ▼
┌─────────────────────────────────────────────────────────────┐
│  Determine, by the PCF and based on the RLOS information,   │
│  the restricted service type, and the allowed NSSAI, policy │
│  and charging rule(s) of the RLOS(s) for the wireless device│
│                            3030                             │
└─────────────────────────────────────────────────────────────┘
                              │
                              ▼
┌─────────────────────────────────────────────────────────────┐
│  Send, by the PCF to the SMF and in response to the 2nd     │
│  message, a third message comprising at least one of: the   │
│  policy and charging rule(s); the RLOS information; or the  │
│  allowed NSSAI                                              │
│                            3040                             │
└─────────────────────────────────────────────────────────────┘
```

FIG. 30

RESTRICTED SERVICE TYPE FOR RESTRICTED LOCAL OPERATOR SERVICES IN A WIRELESS NETWORK

CROSS-REFERENCE TO RELATED APPLICATIONS

This application is a continuation of U.S. patent application Ser. No. 17/033,098, filed Sep. 25, 2020, which is a continuation of U.S. patent application Ser. No. 16/707,258, filed Dec. 9, 2019 (now U.S. Pat. No. 10,791,509), which is a continuation of U.S. patent application Ser. No. 16/387,321, filed Apr. 17, 2019 (now U.S. Pat. No. 10,506,506), which claims the benefit of U.S. Provisional Application No. 62/664,533, filed Apr. 30, 2018, all of which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A and FIG. 5B depict registration management state models as per an aspect of embodiments of the present disclosure.

FIG. 6A and FIG. 6B depict connection management state models as per an aspect of embodiments of the present disclosure.

FIG. 24 is a flow diagram of aspects of embodiments of the present disclosure.

FIG. 26 is a flow diagram of aspects of embodiments of the present disclosure.

FIG. 28 is a flow diagram of aspects of embodiments of the present disclosure.

FIG. 29 is a flow diagram of aspects of embodiments of the present disclosure.

FIG. 30 is a flow diagram of aspects of embodiments of the present disclosure.

DETAILED DESCRIPTION OF EXAMPLES

Example embodiments of the present invention enable implementation of enhanced features and functionalities in 5G systems. More particularly, the embodiments of the technology disclosed herein may relate to 5G policy control for restricted local operator services. Throughout the present disclosure, UE, wireless device, and mobile device are used interchangeably.

Figure 1:
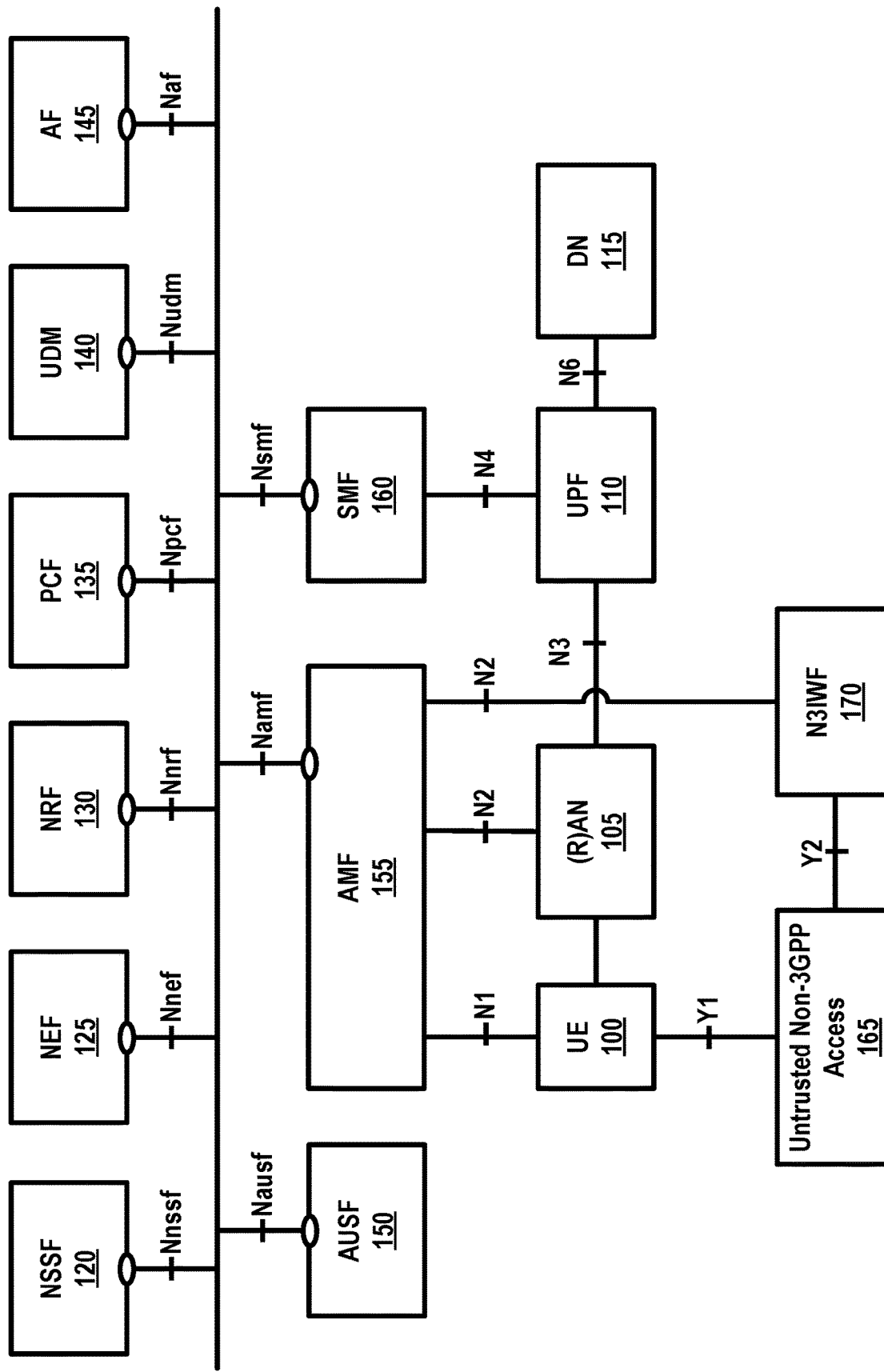
FIG. 1 is a diagram of an example 5G system architecture as per an aspect of an embodiment of the present disclosure.
Figure 2:
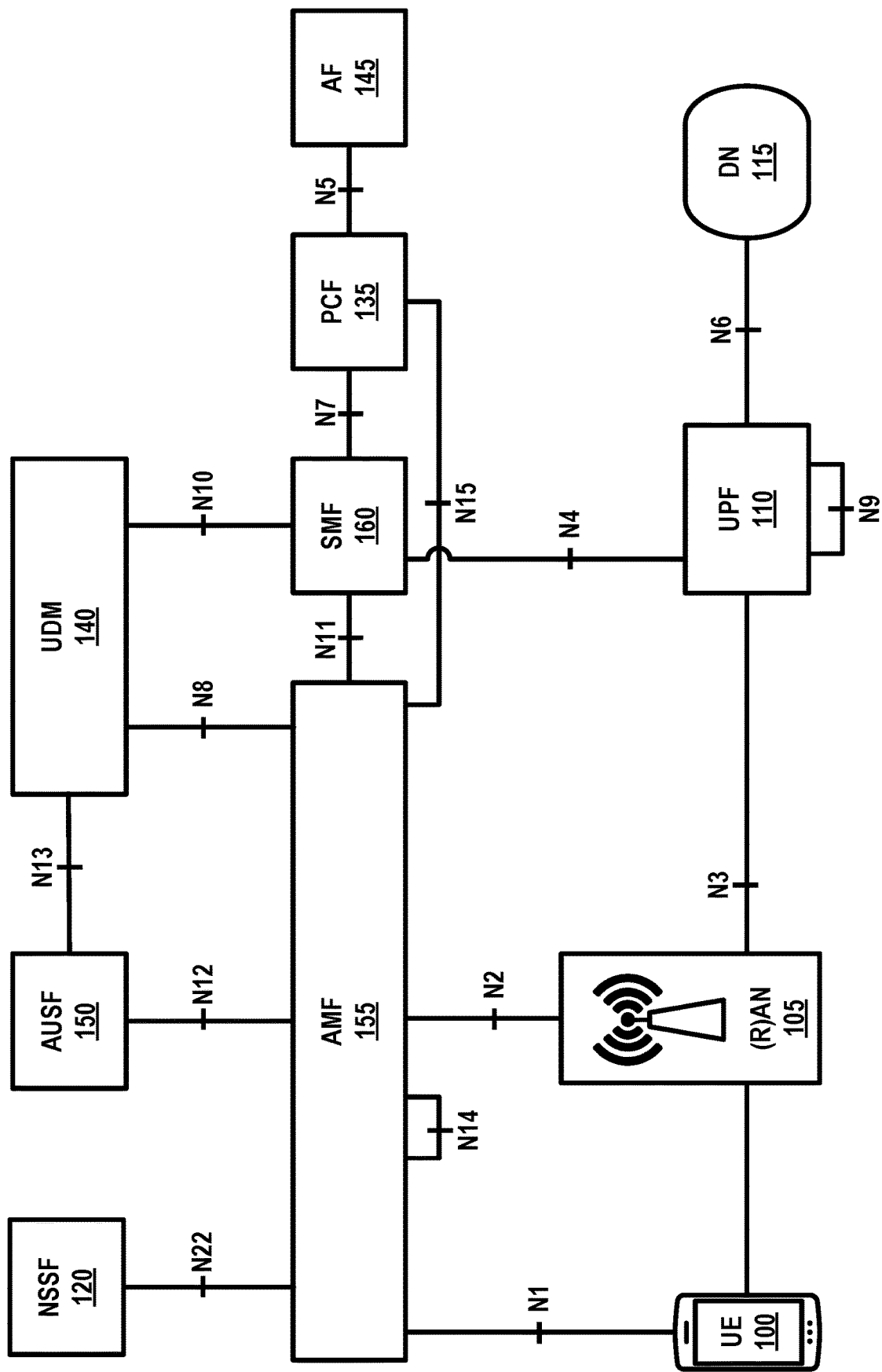
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
ADS Access Domain Selection
AF Application Function
AMBR Aggregate Maximum Bit Rate
AMF Access and Mobility Management Function
AN Access Network
APN Access Point Name
ARP Allocation and Retention Priority
BWP Bandwidth Part
CCNF Common Control Network Functions
CN Core Network
CP Control Plane
C-RNTI Cell-Radio Network Temporary Identifier
CS Configured Scheduling
CSCF Call Session Control Function
CSI Channel State Information
CSI-RS Channel State Information-Reference Signal
DPI Deep Packet Inspection
DL Downlink
DN Data Network
DN-AAA Data Network Authentication Authorization and Accounting
DNN Data Network Name EPS Evolved Packet System
gNB NR NodeB
GW Gateway
HSS Home Subscriber Server
I-CSCF Interrogating CSCF
IMEI International Mobile Equipment Identity
IMS IP Multimedia core network Subsystem
IMSI International Mobile Subscriber Identity
IP Internet Protocol
IP-CAN IP Connectivity Access Network
L2 Layer 2 (data link layer)
L3 Layer 3 (network layer)
LADN Local Area Data Network
MAC Media Access Control
MICO Mobile Initiated Connection Only
N3IWF Non-3GPP InterWorking Function
NAI Network Access Identifier
NAS Non Access Stratum
NEF Network Exposure Function
NF Network Function
NR New Radio
NG-RAN NR Radio Access Network
NRF Network Repository Function
NSI Network Slice Instance
NSSAI Network Slice Selection Assistance Information
NSSF Network Slice Selection Function
OFDM Orthogonal Frequency Division Multiplexing
PCC Policy and Charging Control
PCF Policy Control Function
PCO Protocol Configuration Options
P-CSCF Proxy CSCF
PDCCH Physical Downlink Control Channel
PDCP Packet Data Convergence Protocol
PDN Packet Data Network
PD Packet Data Unit
PEI Permanent Equipment Identifier
PLMN Public Land Mobile Network
PRACH Physical Random Access CHannel
PUSCH Physical Uplink Shared CHannel
RA Random Access
RACH Random Access CHannel
RAN Radio Access Network
RA-RNTI Random Access-Radio Network Temporary Identifier
RLOS Restricted Local Operator Service
RRC Radio Resource Control
RSRP Reference Signal Received Power
SIP Session Initiation Protocol
RB Radio Bearer
RRC Radio Resource Control
RM Registration Management
SBA Service Based Architecture
S-CSCF Serving CSCF
SGW Serving Gateway
SCC AS Service Centralization and Continuity Application Server
SDU Service Data Unit
SIB System Information Blocks
SMF Session Management Function
SMSF SMS Function
SN Sequence Number
S-NSSAI Single Network Slice Selection Assistance information
SRB Signaling Radio Bearer carrying control plane data
SS Synchronization Signal
SUPI Subscriber Permanent Identifier
TDF Traffic Detection Function
TA Tracking Area
T-ADS Terminating ADS
TAI Tracking Area Identity
TCP Transmission Control Protocol
TC-RNTI Temporary Cell-Radio Network Temporary Identifier
UDM Unified Data Management
UDP User Datagram Protocol
UE User Equipment
UL Uplink
UL CL Uplink Classifier
UPF User Plane Function
VPCF Visited PCF Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
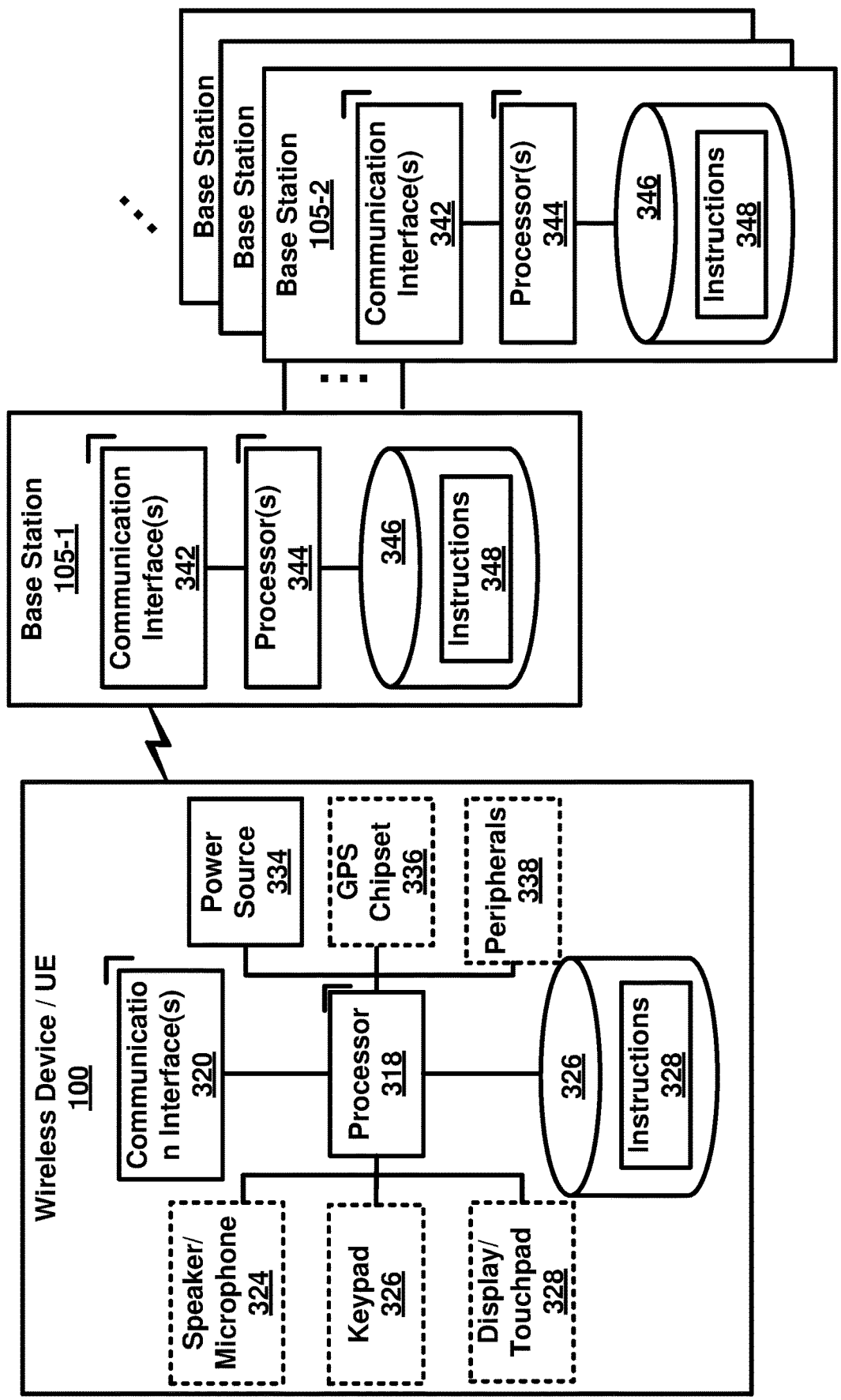
FIG. 3 is a system diagram of an example wireless device and a network node in a 5G system as per an aspect of an embodiment of the present disclosure.
Figure 4:
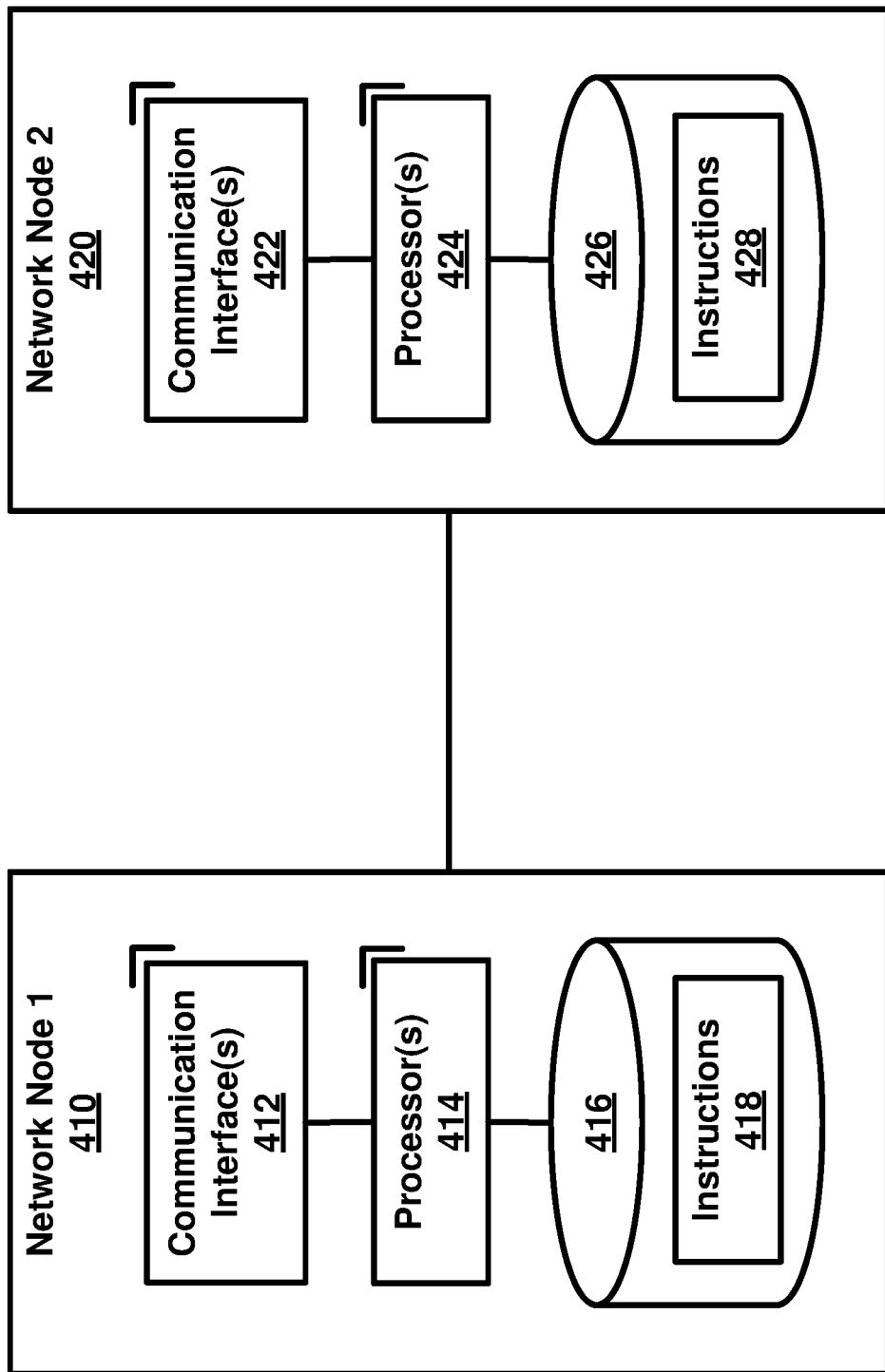
FIG. 4 is a system diagram of an example wireless device as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(*s*) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
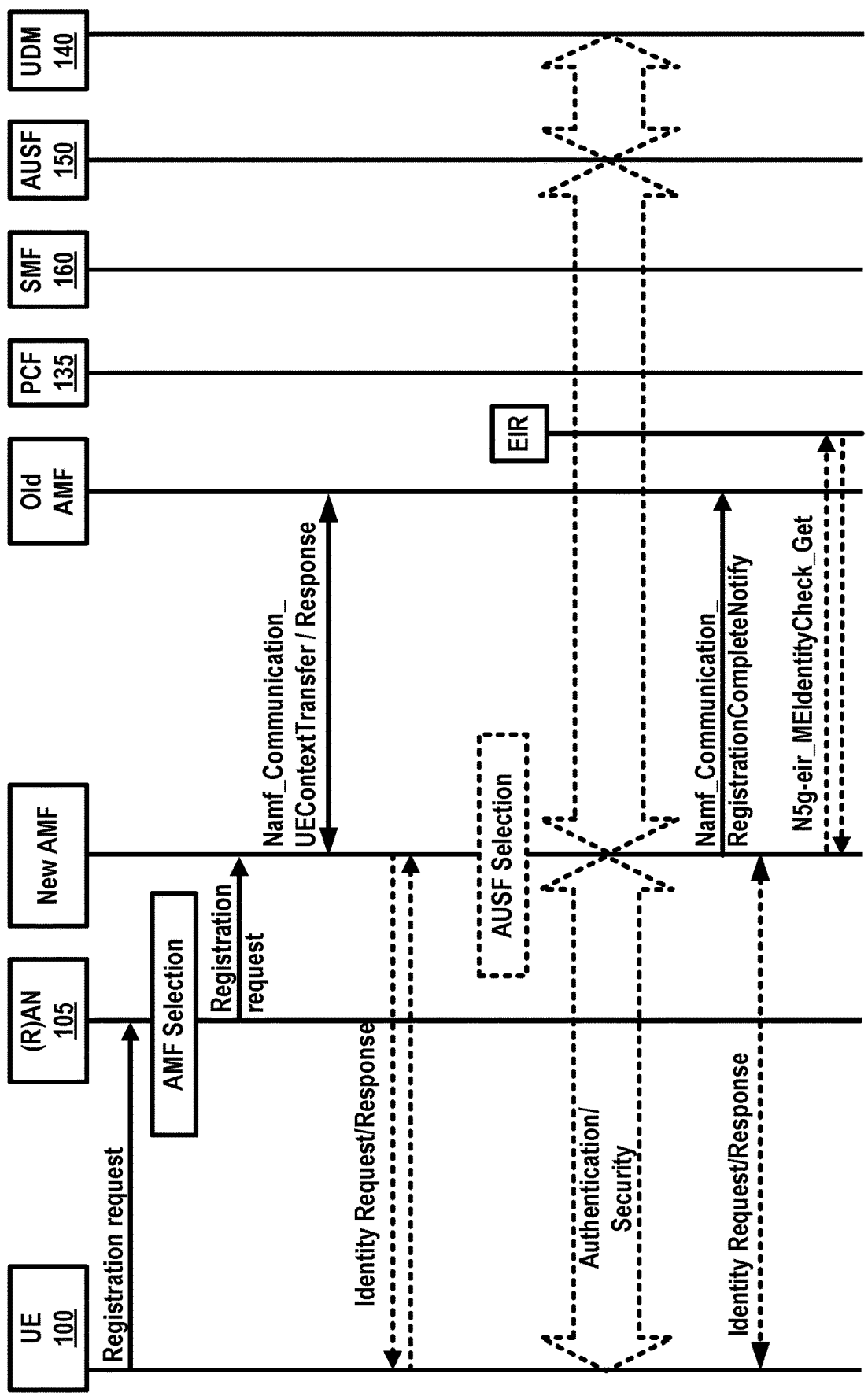
FIG. 8 is an example call flow as per an aspect of an embodiment of the present disclosure.
Figure 9:
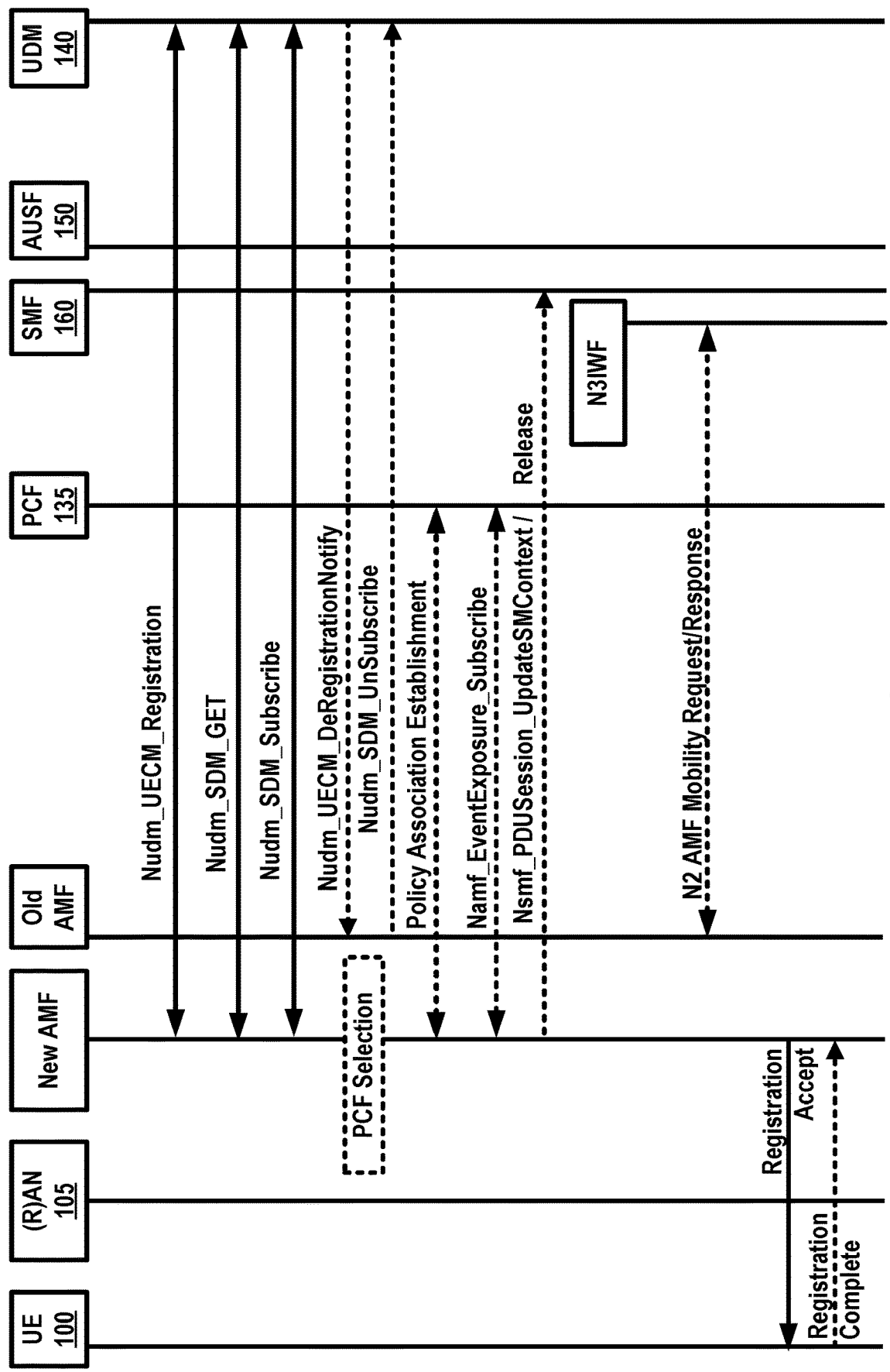
FIG. 9 is an example call flow as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
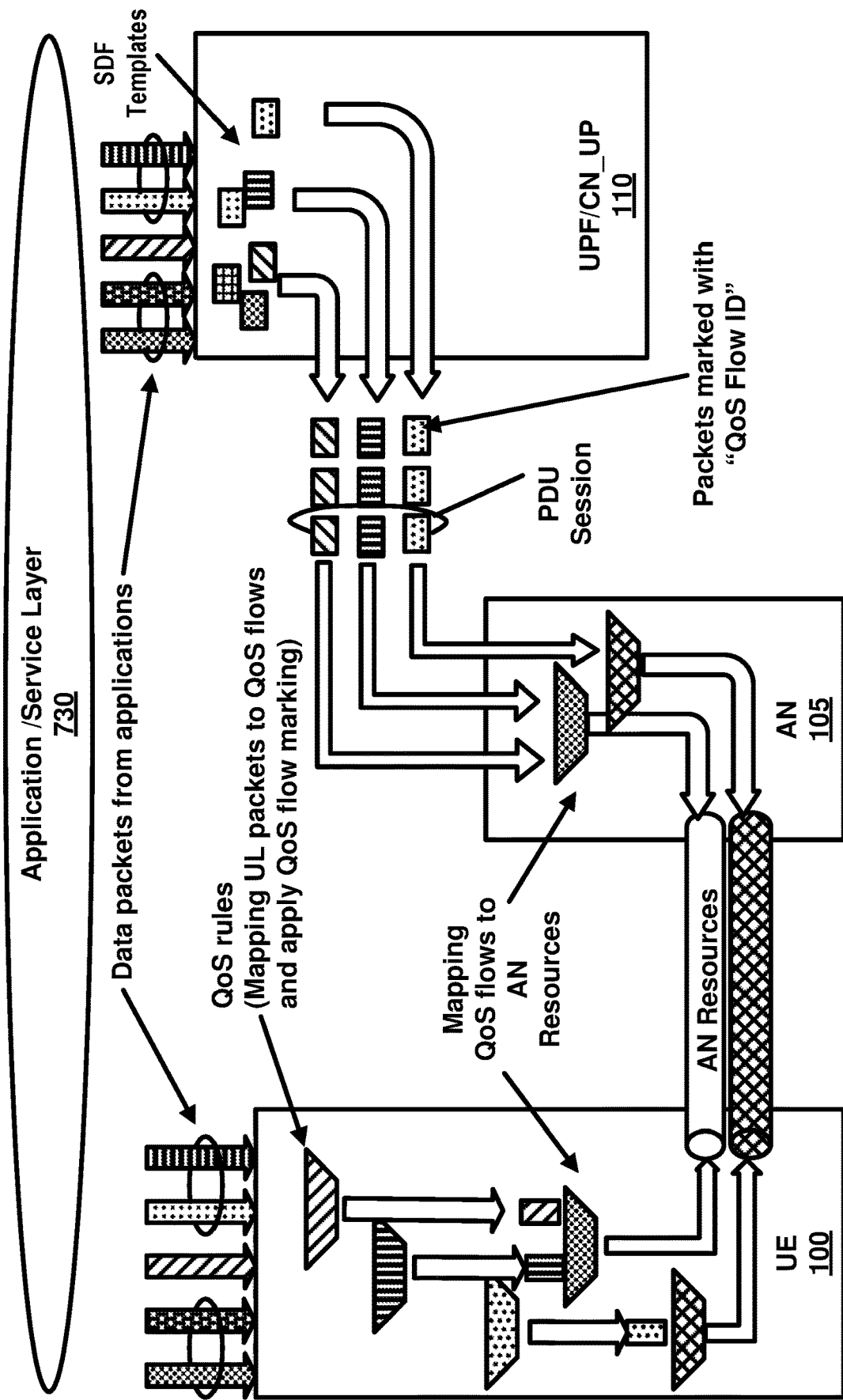
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like.).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEF 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to the a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection.

In an example, the (R)AN 105 may send to the new AMF 155 an N2 message (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request). In an example, if the UE's 5G-GUTI was included in the registration request and the serving AMF 155 has changed since last registration procedure, the new AMF 155 may invoke the Namf_Communication_UEContextTransfer service operation on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure may be initiated by the AMF 155 sending an identity request message to the UE 100 requesting the SUCI.

In an example, the UE 100 may respond with an identity response message including the SUCI. The UE 100 may derive the SUCI by using the provisioned public key of the HPLMN.

In an example, the AMF 155 may decide to initiate UE 100 authentication by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration, the AMF 155 may skip the authentication and security setup, or the AMF 155 may accept that the authentication may fail and may continue the registration procedure.

In an example, the authentication may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check by invoking the N5g-eir_EquipmentIdentity-Check_Get service operation.

In an example, the new AMF 155, based on the SUPI, may select a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get. The UDM 140 may retrieve this information from UDR by Nudr_UDM_Query (access and mobility subscription data). After a successful response is received, the AMF 155 may subscribe to be notified using Nudm_SDM_Subscribe when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select a PCF 135.

In an example, the new AMF 155 may perform a policy association establishment during registration procedure. If the new AMF 155 contacts the PCF 135 identified by the (V-)PCF ID received during inter-AMF 155 mobility, the new AMF 155 may include the PCF-ID in the Npcf_AM-PolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_Event-Exposure_Subscribe service operation for UE 100 event subscription.

In an example, the AMF 155 may send to the SMF 160 an Nsmf_PDUSession_UpdateSMContext. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(*s*) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155155 may send to a N3IWF an N2 AMF 155 mobility request. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response.

In an example, the new AMF 155 may send to the UE 100 a registration accept (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete message. In an example, the UE 100 may send the registration complete message to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
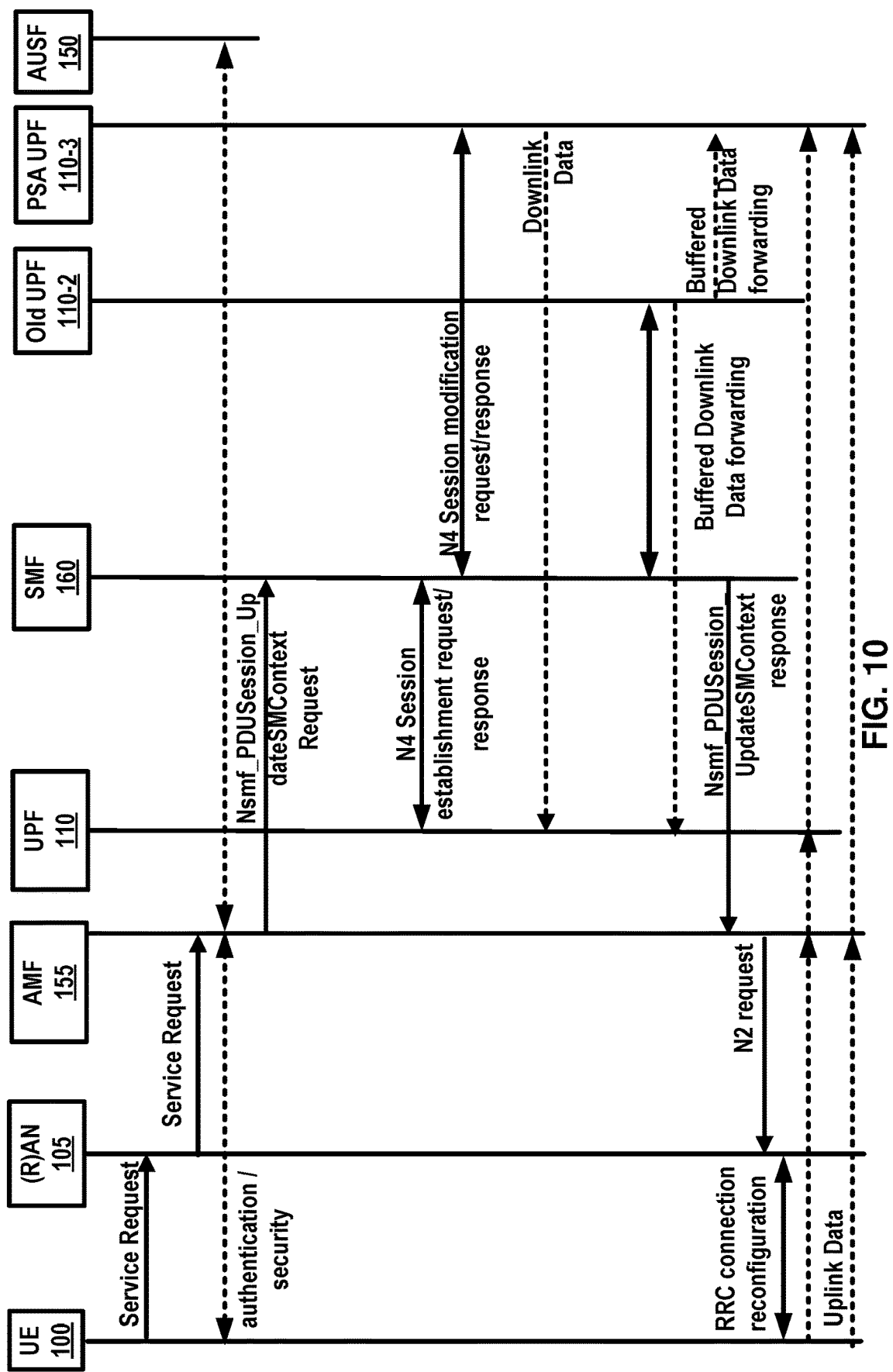
FIG. 10 is an example call flow as per an aspect of an embodiment of the present disclosure.
Figure 11:
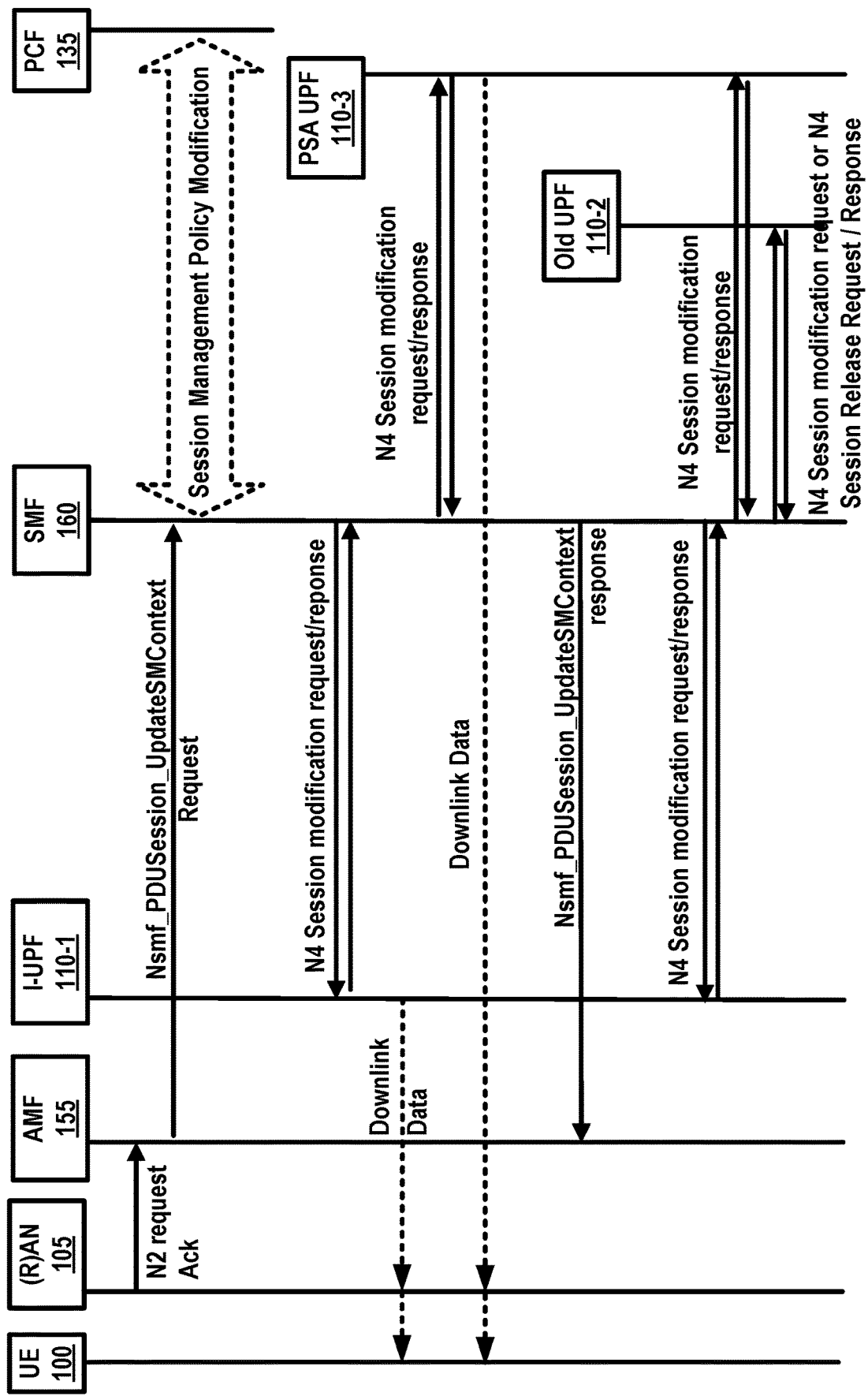
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_PDUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send an Nsmf_PDUSession_UpdateSMContext request to SMF 160($s$) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (i.e. IPv4, IPv6, IPv4v6, ethernet type or unstructured type) and if applicable, the static IP address/prefix, SSC mode selected for the PDU session, UE 100 subscription profile in UDM 140, DNAI included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message e.g., a Nsmf_PDUSession_UpdateSMContext response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_UpdateSMContext response to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSM-Context response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSM-Context response service operations from all the SMF 160s associated with the UE 100 may be received. In such case, the N2 request message may include the N2 SM information received in each of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that me be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure to the new I-UPF 110 and may provide AN tunnel info. The downlink data from the new I-UPF 110 may be forwarded to RAN 105 and UE 100. In an example, the UPF 110 may send to the SMF 160, an N4 session modification response. In an example, the SMF 160 may send to the AMF 155, an Nsmf_PDUSession_UpdateSMContext response.

In an example, if forwarding tunnel may be established to the new I-UPF 110 and if the timer SMF 160 set for forwarding tunnel may be expired, the SMF 160 may sends N4 session modification request to new (intermediate) UPF 110 acting as N3 terminating point to release the forwarding tunnel. In an example, the new (intermediate) UPF 110 may send to the SMF 160 an N4 session modification response. In an example, the SMF 160 may send to the PSA UPF 110-3 an N4 session modification request, or N4 session release request. In an example, if the SMF 160 may continue using the old UPF 110-2, the SMF 160 may send an N4 session modification request, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
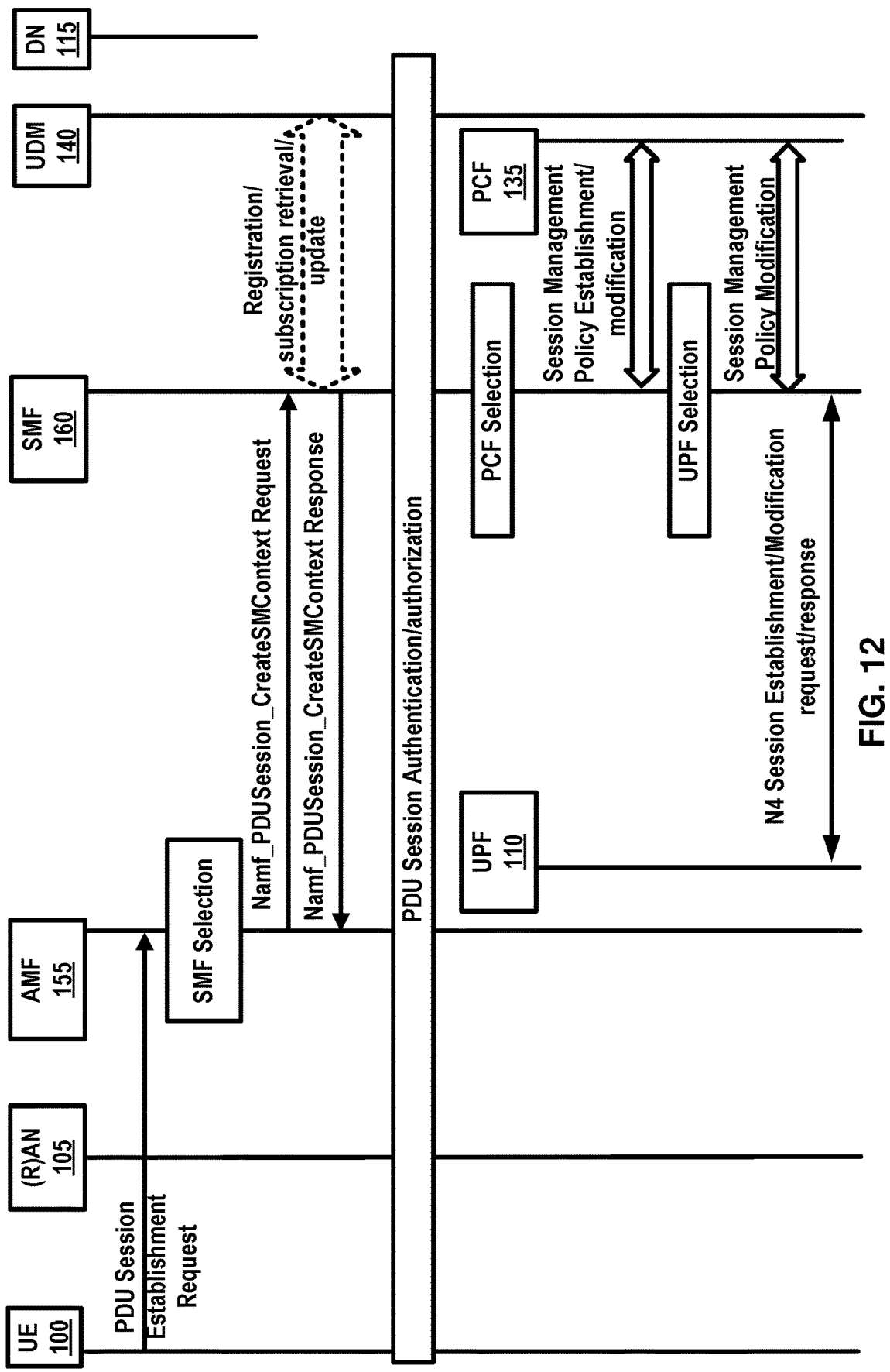
FIG. 12 is an example call flow as per an aspect of an embodiment of the present disclosure.
Figure 13:
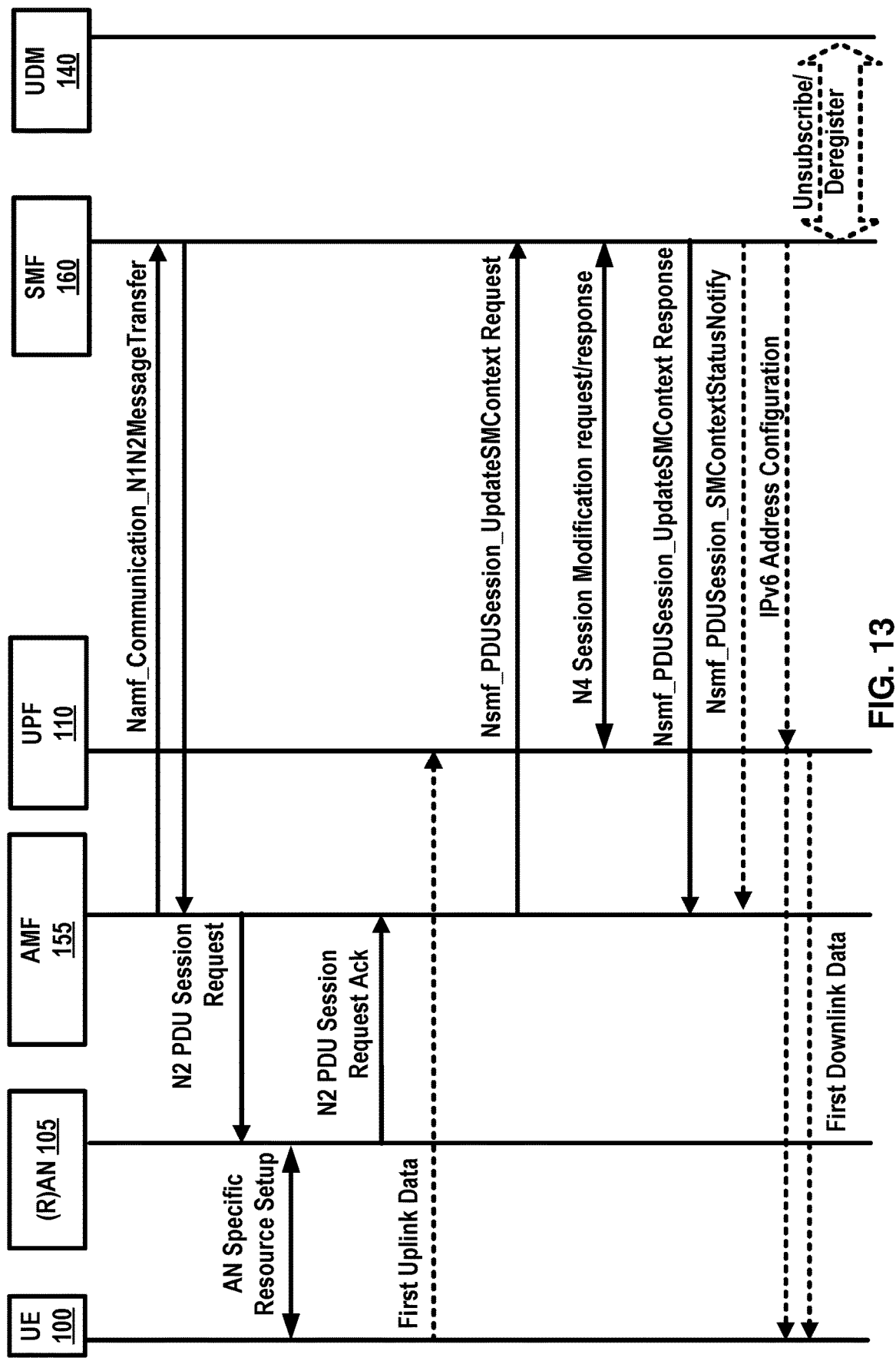
FIG. 13 is an example call flow as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription if it may contain only one default S-NSSAI, or based on operator policy. In an example, the AMF 155 may perform SMF 160 selection and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message, e.g., Nsmf_PDUSession_CreateSMContext request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response, e.g., either a PDU session create/update response, Nsmf_PDUSession_CreateSMContext response (cause, SM context ID or N1 SM container (PDU session reject(cause))) or an Nsmf_PDUSession_UpdateSMContext response.

In an example, if the SMF 160 may perform secondary authorization/authentication during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure to establish a PDU session with the PCF 135 and may get the default PCC Rules for the PDU session. The GPSI may be included if available at the SMF 160. If the request type in indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in indicates initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in is existing PDU session, the SMF 160 may maintain the same IP address/prefix that may be allocated to the UE 100 in the source network.

In an example, if the request type in indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select the UPF 110 and may select SSC mode 1.

In an example, the SMF 160 may perform a session management policy modification procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure with the selected UPF 110. The SMF 160 may initiate an N4 session modification procedure with the selected UPF 110. In an example, the SMF 160 may send an N4 session establishment/modification request to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response. If CN tunnel info is allocated by the UPF, the CN tunnel info may be provided to SMF 160. In an example, if multiple UPFs are selected for the PDU session, the SMF 160 may initiate N4 session establishment/modification procedure with each UPF 110 of the PDU session.

In an example, the SMF 160 may send to the AMF 155 an Namf_Communication_N1N2MessageTransfer message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer may further comprise the PDU session ID and information allowing the AMF 155 to know which access towards the UE 100 to use.

In an example, the AMF 155 may send to the (R)AN105 an N2 PDU session request (comprising N2 SM information, NAS message (PDU session ID, N1 SM container (PDU session establishment accept, and/or the like))). In an example, the AMF 155 may send the NAS message that may comprise PDU session ID and PDU session establishment accept targeted to the UE 100 and the N2 SM information received from the SMF 160 within the N2 PDU session request to the (R)AN 105.

In an example, the (R)AN 105 may issue AN specific signaling exchange with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure with the UPF110. The SMF 160 may provide AN tunnel info to the UPF 110 as well as the corresponding forwarding rules. In an example, the UPF 110 may provide an N4 session modification response to the SMF 160160.

In an example, the SMF 160 may send to the AMF 155 an Nsmf_PDUSession_UpdateSMContext response (Cause). In an example, the SMF 160 may subscribe to the UE 100 mobility event notification from the AMF 155 (e.g. location reporting, UE 100 moving into or out of area of interest), after this step by invoking Namf_EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release). In an example, if during the procedure, any time the PDU session establishment is not successful, the SMF 160 may inform the AMF 155 by invoking Nsmf_PDUSession_SMContextStatusNotify(release) 135. The SMF 160 may releases any N4 session(s) created, any PDU session address if allocated (e.g. IP address) and may release the association with the PCF 135.

In an example, in case of PDU type IPv6, the SMF 160 may generate an IPv6 Router Advertisement and may send it to the UE 100 via N4 and the UPF 110.

In an example, if the PDU session may not be established, the SMF 160 may unsubscribe to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister for the given PDU session using Nudm_UECM_Deregistration (SUPI, DNN, PDU session ID).

Figure 14:
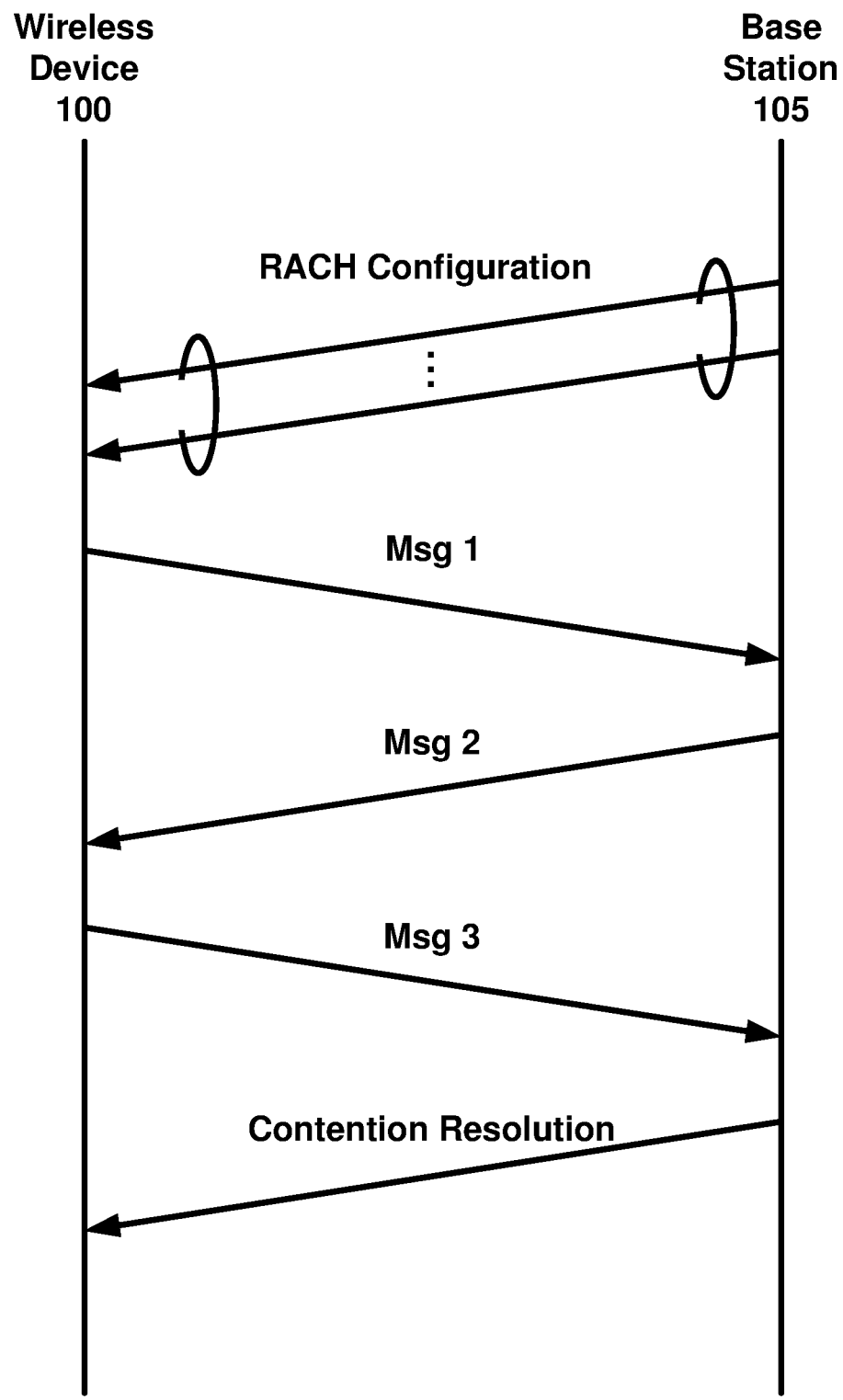
FIG. 14 is a diagram of an example random access procedure as per an aspect of an embodiment of the present disclosure.

FIG. 14 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 transmissions, one or more Msg2 transmissions, one or more Msg3 transmissions, and contention resolution. For example, a contention free random access procedure may comprise one or more Msg 1 transmissions and one or more Msg2 transmissions.

In an example, a base station may transmit (e.g., unicast, multicast, or broadcast), to a UE, a RACH configuration via one or more beams. The RACH configuration may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1.

In an example, a UE may receive, from a base station, a random access response, Msg 2. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 may be provided by at least one higher layer (e.g. RRC) parameter. A UE may transmit a random access preamble via PRACH and Msg3 via PUSCH on a same cell. A base station may indicate an UL BWP for a PUSCH transmission of Msg3 via system information block. A UE may employ HARQ for a retransmission of Msg 3.

In an example, multiple UEs may perform Msg 1 by transmitting a same preamble to a base station and receive, from the base station, a same random access response comprising an identity (e.g., TC-RNTI). Contention resolution may ensure that a UE does not incorrectly use an identity of another UE. For example, contention resolution may be based on C-RNTI on PDCCH or a UE contention resolution identity on DL-SCH. For example, if a base station assigns a C-RNTI to a UE, the UE may perform contention resolution based on a reception of a PDCCH transmission that is addressed to the C-RNTI. In response to detection of a C-RNTI on a PDCCH, a UE may consider contention resolution successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3, a UE may consider the contention resolution successful and may consider the random access procedure successfully completed.

As an example, a serving network may need to broadcast its support to RLOS to all UEs that attempt an attach to a PLMN. This may enable the UE to act accordingly if access to such services are requested by the user and supported by the UE. A serving network may provide an access stratum broadcast indication to UEs when the operator supports RLOS. The indication may imply both the access network and IMS support RLOS.

As an example, the access stratum broadcast indicator may be determined according to operators' preference and indicates that the PLMN, or all the PLMNs in the case of network sharing, in addition to IMS, support RLOS.

As an example, a UE, that has not received access stratum broadcast indicator and is not being successfully authenticated by the serving network, may not be allowed to attach to the network for any services.

As an example, a UE may need to understand the access stratum broadcast indicator, and an (R)AN may support the access stratum broadcast indicator.

As an example, UEs that require access to RLOS may include an indication in registration request that access to RLOS may be required. An AMF in serving network supporting RLOS services may be configured with an DNN dedicated for RLOS. During PDU session establishment initiated by the UE to the DNN dedicated to RLOS, a PCF may activate PCC rule(s) that may ensure that the UE is allowed to access a portal.

The AMF may be configured with the DNN dedicated for RLOS and may implement the above functionality for authenticated and non-authenticated UEs. During registration request, if the RLOS indication is included by the UE, and/or if UE authentication is not successfully authenticated, or authentication cannot be performed, the AMF may initiate a session towards the configured DNN dedicated to RLOS which connects the user to an operator portal for RLOS services. If the UE is successfully authenticated, the AMF may initiate a session towards the configured DNN dedicated to RLOS. The registration request may comprise the RLOS indication to gain access to RLOS.

As an example, in order to access RLOS, a UE may perform an IMS registration and may include a feature tag to indicate its support for RLOS. A UE that may require access to RLOS may insert a RLOS supporting indication in a session initiation request. A P-CSCF supporting RLOS may be configured with a list of RLOS supported by an operator. In an example, a P-CSCF, an S-CSCF, and/or the like may support enabling unauthenticated users and/or authenticated users access to RLOS when an incoming session may include a RLOS supporting indication. Including the RLOS supporting indication by the UE to access RLOS in conjunction with a configured list of RLOS in the P-CSCF may ensure that no UE can access any other services when accessing RLOS. This may ensure that authenticated users may not use RLOS supporting indication to access other services and be charged at the RLOS rate, which may be free. The S-CSCF may ensure that RLOS supporting indication is included in a call detail/data record, charging data record (CDR), and/or the like. A P-CSCF supporting RLOS can also be used for IMS users.

A P-CSCF supporting RLOS may be configured with a list of RLOS services. A UE that requires access to RLOS may perform IMS registration and may include a feature tag to indicate its support for RLOS. If the user cannot be authenticated, the P-CSCF may create a temporary record and mark the user e.g., as "RLOS only user". The P-CSCF may send a request to a S-CSCF that supports RLOS. The S-CSCF may create a default profile for the UE, and the IMS registration may be accepted. For authenticated users, an I-CSCF may allocate to the UE a S-CSCF that may support RLOS at UE registration. In an example, the allocation may be based on a new capability information received by the I-CSCF during the UE registration. A UE that may require access to RLOS may insert an indicator in the session initiation request and include the requested RLOS in the Request-URI of the session initiation request. Upon receipt by a P-CSCF of session initiation request and if the P-CSCF supports RLOS, the P-CSCF may accept the session if the requested RLOS service in the incoming R-URI is configured in the P-CSCF. The P-CSCF may forward the incoming request to the S-CSCF allocated to the UE at registration. The P-CSCF may reject an incoming session without an RLOS indication for users marked as "RLOS only users". Upon receipt by a S-CSCF of an RLOS request and if the incoming request includes an RLOS indication, the S-CSCF may route the session towards the destination. No originating services may be permitted, i.e. the UE profile for authenticated users may not be considered.

The S-CSCF may include in the CDR an indication that the session may be for RLOS. A HSS may support enabling a S-CSCF to declare RLOS as supporting capability. A Gm interface may be enhanced to enable conveying the RLOS indication. A Cx interface may support new RLOS capability.

As an example, a new system information blocks (SIB) provided by a (R)AN may indicate a PLMN supports restricted local operator services and the level of support i.e. whether it is for unauthenticated and/or authenticated UEs or allows access to any UE. The PLMNs where RLOS is supported may be stored in universal integrated-circuit card (UICC) for the UE.

UE may see through SIB that PLMN supports Restricted Local Operator Services and the level of support i.e. whether it is for unauthenticated and/or authenticated UEs or allows access to any UE. If the SIB indicates support for authenticated and/or unauthenticated UEs, the UE in related state (authenticated or unauthenticated) may use Restricted Local Operator Services in PLMNs where the SIB is indicating support and are stored in UICC or ME (in case the UE is UICC-less). If the SIB indicates support for RLOS from any UE then UEs that do not have this PLMN stored in UICC or ME may use RLOS in this specific PLMN.

Figure 15:
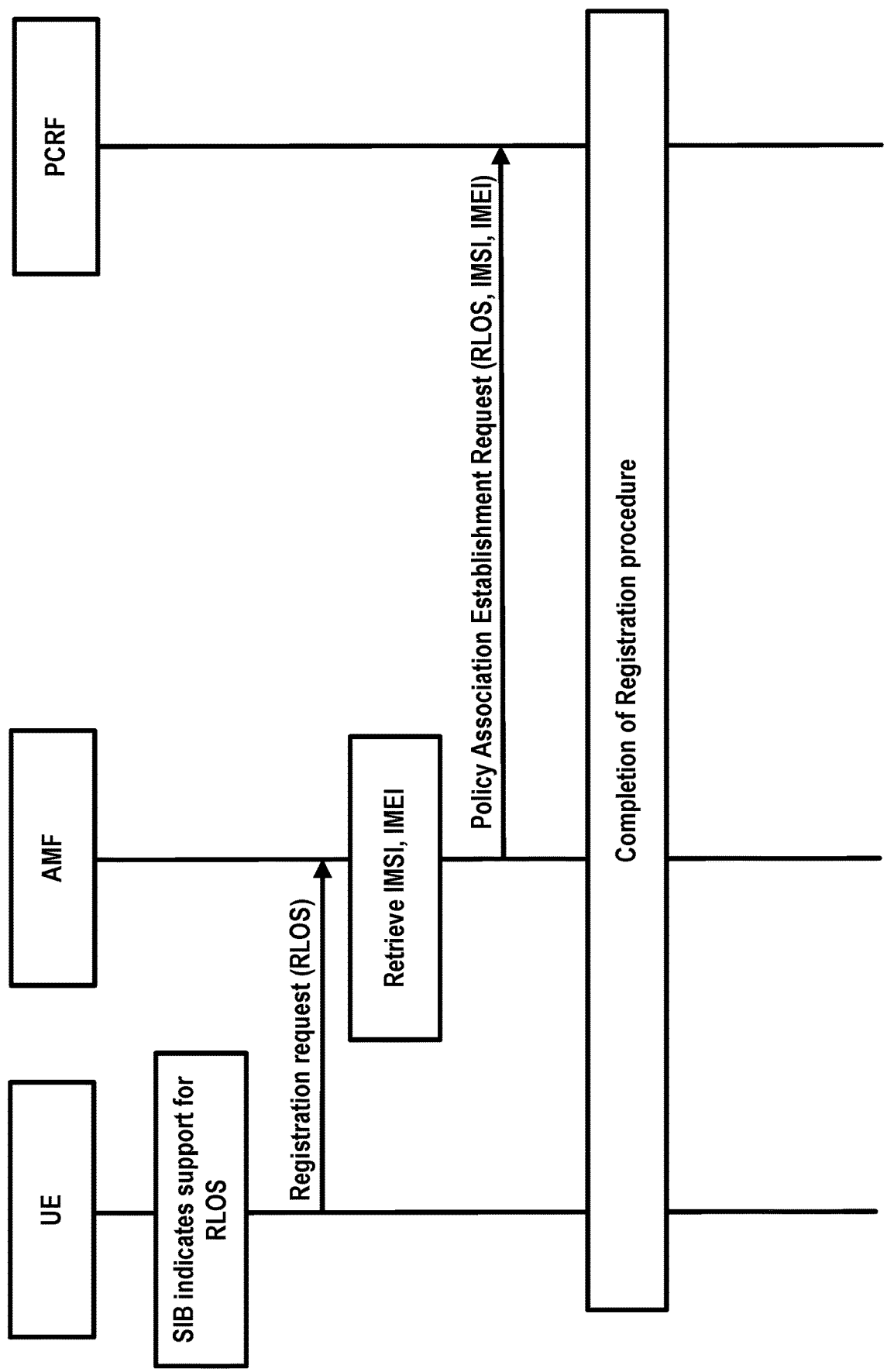
FIG. 15 is an example call flow diagram of registration procedure for restricted local operator services as per an aspect of an embodiment of the present disclosure.

FIG. 15 is an example call flow diagram of registration procedure for restricted local operator services as per an aspect of an embodiment of the present disclosure. As an example, a new SIB provided by (R)AN may indicate that PLMN supports restricted local operator services. A UE may registration for restricted local operator services. If the UE is unauthenticated an indication in registration message may be provided for restricted local operator services (this may be similar to the Emergency indication that is used for "unauthenticated" UEs for emergency calls). The UE does not need to be authenticated, IMSI and IMEI(SV) may be retrieved from the UE. The MSISDN (if available) may be provided by the UDM.

An AMF may send a message towards a PCF including the indication that is for RLOS, with the IMSI, the IMEI(SV) and the MSISDN (if available).

The UE may complete the registration procedure.

Figure 16:
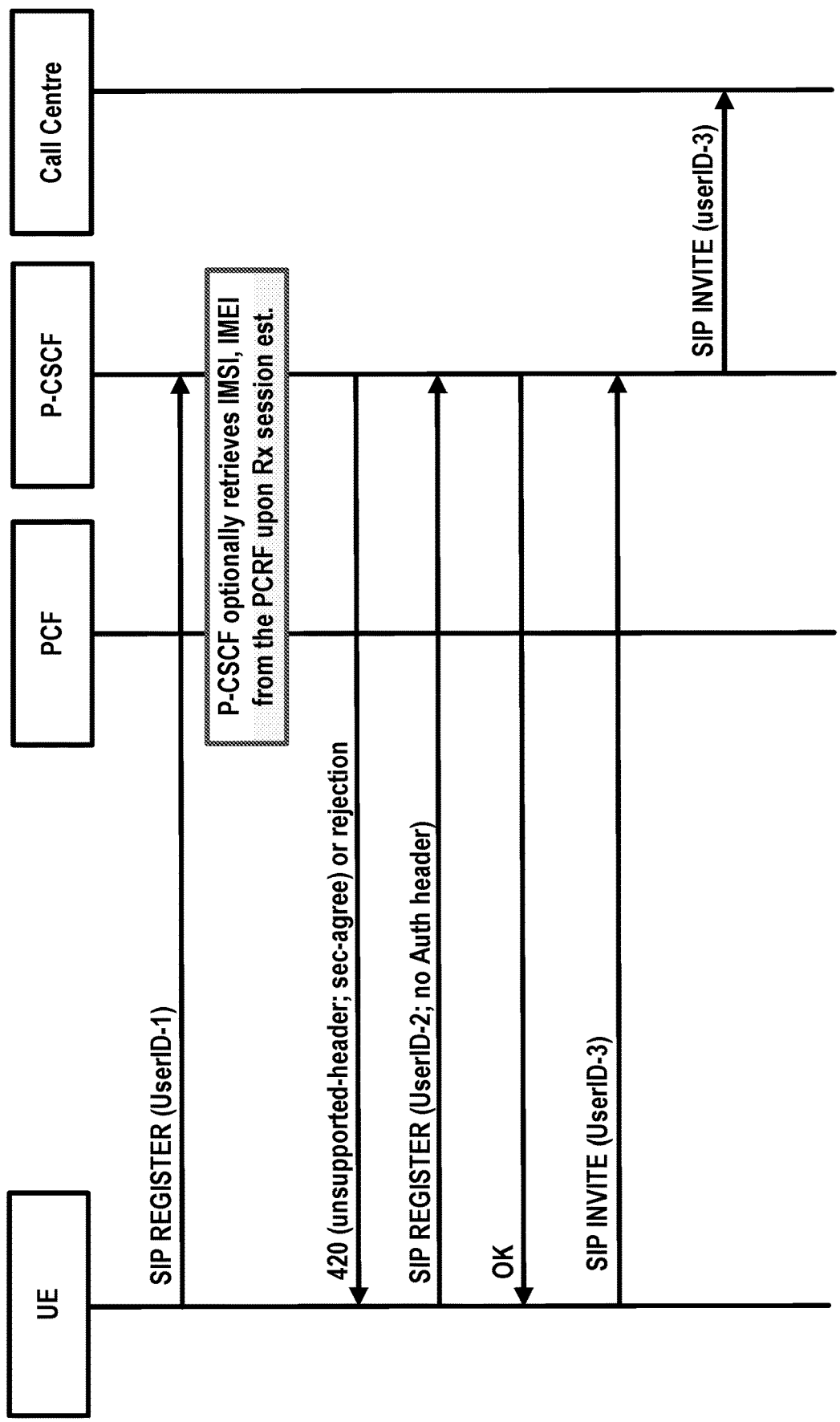
FIG. 16 is an example call flow diagram of IMS procedure for restricted local operator services as per an aspect of an embodiment of the present disclosure.

FIG. 16 is an example call flow diagram of IMS procedure for restricted local operator services as per an aspect of an embodiment of the present disclosure. As an example, if the UE is unauthenticated in IMS it may initiate IMS registration by sending a SIP REGISTER (UserID-1) message indicating that is IMS Registration for RLOS. Upon reception of the SIP REGISTER message, a P-CSCF may determine that it is for RLOS. The P-CSCF may request the PCF for UE identities (e.g. IMSI, IMEI(SV), MSISDN) in the Rx session establishment request. The PCF may perform session binding based on the UE's IP address/prefix and provide one or more UE identities and the MSISDN (if available) to the P-CSCF. The P-CSCF may responds with a 420 response with sec-agree value listed in the unsupported header field. UE may perform a new initial registration by sending a SIP REGISTER (UserID-2, IMEI) message and without inclusion of the Authorization header field. UserID-2 may be a public user identity derived from IMSI. P-CSCF may verify the IMSI/IMEI provided by the PCF against the IMSI/IMEI derived from the public user identity provided by the UE, prior to accepting the SIP REGISTER message. P-CSCF may accept the registration with 200 OK and provides a tel-URI based on the MSISDN (if available) received from PCF to the UE. UE may attempt an RLOS session by sending a SIP INVITE (UserID-3) message. UserID-3 may be set to UE's public identity. The P-CSCF may verify whether the UserID-3 indicated in the SIP INVITE message complies with the tel-URI that was provided to the UE. If compliant, P-CSCF may forwards the SIP INVITE towards the Call Centre that is providing the RLOS.

As an example, one or more of the following actions may be performed:

If a UE is aware that the user is requesting RLOS, then the UE may check whether the PLMN is advertising its support of RLOS to all UEs. If a PLMN does not advertise its support of RLOS, the UE may block the origination attempt. If the PLMN announces its support of RLOS, the UE may proceed to attach by sending an Registration Request in which it may indicate that the attachment is for RLOS (via e.g. Request Type) and it may provide its IMSI (or its IMEI if the UE has no IMSI).

If an AMF is not configured to support RLOS Attach, the AMF may reject any Attach Request that indicates "RLOS". When the UE has indicated that the registration request is for RLOS, and if the UE identifies itself with a temporary identity, the AMF may reject the registration request.

If the AMF is configured to support RLOS for unauthenticated IMSIs and the UE has indicated that the attach request is for RLOS, the AMF may skip the authentication and security setup, or the AMF may accept that the authentication may fail and continues the attach procedure. If the UE has not indicated that the registration request is for RLOS and the authentication fails, and if the AMF is configured to support RLOS, then the AMF may accept the registration request with an RLOS indication: this allows UE's aware they are making an RLOS attempt to avoid sending IMS Registration in case of IMS service.

If the UE has not indicated that the registration request is for RLOS and the authentication fails, and if the AMF is not configured to support RLOS, then the AMF may reject the registration request.

An SMF and a PCF may determine that RLOS are requested based on a RLOS APN received in a message. For RLOS registered UEs which are unauthenticated, the SMF may provide the IMEI as the UE identity instead of IMSI, to the PCF. If a PCC is configured to support RLOS and if dynamic PCC is deployed, the PCF, based on the RLOS APN, may set the ARP of the PCC rules to a value that is reserved for RLOS and the authorization of dynamic PCC rules. The AMF may send a registration accept with RLOS indication.

As an example, based on the RLOS indication provided by the UE, the 5GC may establish a PDU session to a specific DNN dedicated to RLOS. The UE may need to select a P-CSCF suitable for RLOS sessions in a PLMN. For that, a P-CSCF address dedicated to RLOS may be provided in the PCO by the SMF during PDU session establishment procedure. This dedicated address enables the use of either a general-purpose P-CSCF or a RLOS-specific P-CSCF. The P-CSCF may detect that the UE is requesting thanks to the address at which the P-CSCF receives the SIP request, P-CSCF can then route the RLOS related SIP requests to a specific RLOS-CSCF to satisfy the IMS network isolation requirement (similar principle as for emergency IMS calls, which uses a specific E-CSCF). When provided, the network provided location information conveyed from the 5G network to the P-CSCF may be forwarded to the RLOS-CSCF. Charging of RLOS IMS sessions may be performed by the IMS network as for a regular IMS sessions.

As an example, if a UE includes RLOS indication in registration request, regardless of authentication successful or not, the existing mechanism of 5G charging, e.g. volume-based charging, time-based charging, can be reused to collect charging information. If the user is not authenticated successfully or cannot be authenticated, certain type of charging (e.g. flow-based charging) may not work. For users that are not authenticated successfully or cannot be authenticated, dedicated DNN may be used for RLOS services, and in this case, the DNN may provide the necessary info for charging. For users that are authenticated successfully, if dedicated DNN is used for RLOS services, the DNN provides necessary info for charging, as for non-authenticated users. If the dedicated DNN for RLOS is not used, instead, a normal DNN is used, separate rating group can be applied to the RLOS services if there is a need to differentiate charging. Based on the above, the existing charging mechanism is sufficient, and there is no need to add new functionality, e.g. there is no need to introduce new RLOS indication from AMF to SMF.

Implementation of existing technologies may have issues in supporting restricted local operator services. The existing technologies may have issues indicating the restricted local operator service information from a network function (e.g. application function) to a PCF. The existing technologies may have issues indicating the restricted local operator service information from the PCF to an AMF and a UE. The existing technologies may have issues supporting access and mobility management policies for the restricted local operator services. For example, when a UE requests a service that is not supported for the UE by the network, the application server may reject the service request from the UE, causing network resources to be wasted. The existing technologies may have issues detecting and limiting the service of the UE to the restricted local operator services. Example embodiments provide enhanced mechanisms to indicate restricted local operator service information from a network function (e.g. application function) to the PCF. Example embodiments provide enhanced mechanisms to indicate the restricted local operator service information to the AMF and the UE, so that the UE may access such services accordingly. Example embodiments provide enhanced mechanisms to indicate access and mobility management policies for restricted local operator services from the PCF to the AMF and to the UE, so that UE may select the access network based on the access and mobility management policies for the restricted local operator services. Example embodiments provide enhanced mechanisms to indicate policy and charging rules from the PCF to the SMF and to the UPF, so that the UPF may enforce the policy and charging rules by detecting the user plan data traffic to ensure that the UE only accesses the restricted local operator services.

Existing technologies may have issues indicating allowed NSSAI and/or PDU session type(s) from a network to a UE, wherein the allowed NSSAI and/or PDU session type may be applied to restricted local operator services. Example embodiments provide enhanced mechanisms to indicate allowed NSSAI and/or PDU session type(s) applied to the restricted local operator service from a base station to the UE. Example embodiments provides enhanced mechanisms to indicate allowed NSSAI and/or PDU session type(s) applied to the restricted local operator service from a PCF to the UE through a AMF.

In an example, a UE (e.g. wireless device) may send an indication in a registration request message that the registration may be for restricted local operator service(s) (RLOS). During the registration procedure, an AMF may send to a PCF a policy request for access and mobility management policies for the restricted local operator services applied to an DNN and/or a wireless device. The PCF may send to the AMF a message comprising restricted local operator service information and/or one or more access and mobility management policies for the restricted local operator services. In an example, the AMF may send the received information to the UE through (R)AN.

Figure 17:
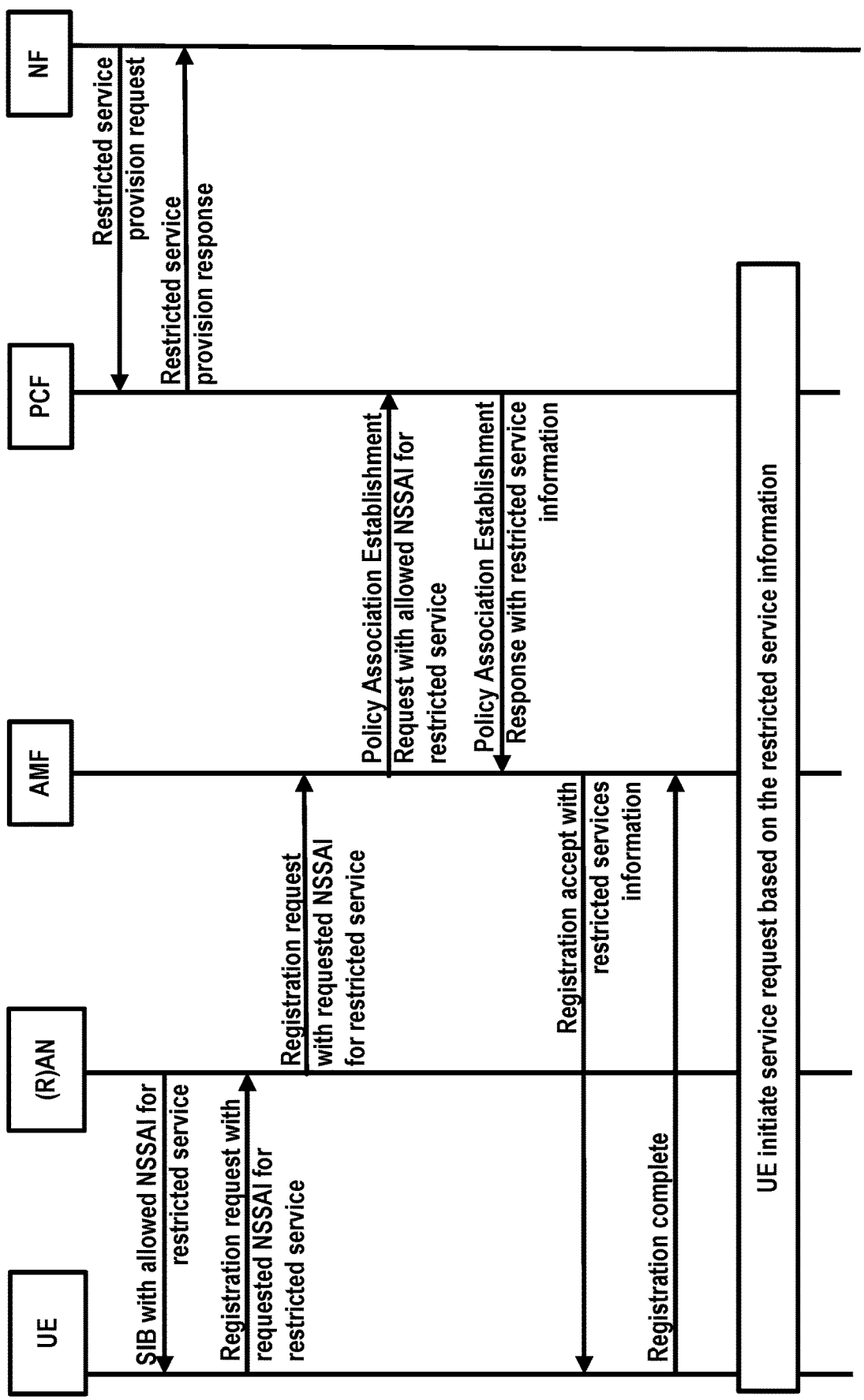
FIG. 17 is example call flow diagram of registration procedure as per an aspect of an embodiment of the present disclosure.

FIG. 17 shows an example call flow which may comprise one or more actions. In an example, a PCF may receive from a network function (NF) a message (e.g. a restricted service provision request) comprising at least one of: an information element indicating restricted local operator service information applied to any wireless device that may request restricted local operator service and/or any wireless device which is unauthenticated in a PLMN; an information element indicating an DNN (e.g. RLOS DNN) (e.g. the DNN is associated with the restricted local operator service information); an information element indicating an NSSAI and/or a network slice instance identifier, for example, the restricted local operator service information is applied to one or more network slices of network slice(s) of the NSSAI and/or the network slice instance(s) of the network slice instance identifier. The NSSAI may be a configured NSSAI, a requested NSSAI or an allowed NSSAI. The network function may comprise an application function (AF), an application server (AS), operations administration maintenance (OAM), and/or the like. The restricted local operator service information may comprise at least one of: an information element indicating a service type of one of the at least one restricted local operator service, an information element indicating application information associated with the service type, and/or the like. The application information may comprise a service data flow filter, an application identifier, a uniform resource locator (URL), and/or the like. As an example, the restricted service provision request message may be used to provide new restricted local operator service information or to update an existing restricted local operator service information.

As an example, HTTP protocol may be used for the communication between the NF and the PCF. The following shows example definitions for the DNN, NSSAI and restricted local operator service information, wherein XML structure of simple elements and/or groups may be used as HTTP message content.

```
<xs:element name="DNN" type="xs:string" />
<xs:element name="NSSAI" type="xs:string" />
<xs:element name=" ServiceType" type="xs: unsignedInt " />
<xs:element name=" AppInfor" type="xs: string" />
<xs:group name="RLOS_Infor">
    <xs:sequence>
        <xs:element ref="ServiceType" />
        <xs:element ref="AppInfor" />
        <xs:any minOccurs="0"/>
    </xs:sequence>
</xs:group>
```

In response to the message received from the NF, the PCF may send to the NF a response message (e.g. a restricted service provision response message) for the message received from the NF.

A UE may receive from a base station (e.g. an (R)AN) a first message (e.g. a broadcast radio resource control (RRC) message, a system information block) indicating that a network (e.g. a PLMN) associated with the base station may support the at least one restricted local operator service. The first message may comprise one or more of: an information element indicating a first allowed NSSAI for the at least one restricted local operator service; and an information element indicating allowed PDU session type(s) for the at least one restricted local operator service. As an example, the UE may receive from the (R)AN that the first allowed NSSAI indicating that an eMBB Slice/Service type (SST) can be used for the at least one restricted local operator service. As an example, the UE may receive from the (R)AN (e.g. the base station) that an allowed PDU session types indicating IPv4, IPv6, IPv4v6, Ethernet or Unstructured PDU session type may be used for the at least one restricted local operator service.

Based on one or more information elements of the first message, the UE may send to the (R)AN a first radio resource control (RRC) message (e.g. an RRC connection complete message and/or an RRC connection request message) comprising a registration request message. The registration request message may comprise one or more of the following parameters and/or messages: AN parameters (e.g. one or more RRC parameters), registration request comprising registration type, Security parameters, UE 5GC Capability, PDU Session status, list of PDU sessions to be activated, etc.

The registration request message may comprise an indication parameter indicating that a registration of the registration request message is for the at least one restricted local operator service.

The registration request message may comprise a requested NSSAI and/or a mapping information of requested NSSAI for the at least one restricted local operator service. The mapping information of requested NSSAI indicates mapping of S-NSSAI of the requested NSSAI to S-NSSAIs of a configured NSSAI for the home PLMN. i.e. part of the configured and/or a first allowed NSSAIs applicable for the PLMN of the base station. The configured and/or the first allowed NSSAIs may be configured or received from the (R)AN. The registration request message may comprise one or more identifiers for the UE, e.g. IMSI, 5G-GUTI, IMEI, TMSI, and/or the like.

In response to the message received from the UE, the (R)AN may forward to an AMF the received registration request message comprising the one or more information elements received from the UE.

In response to the message received from the (R)AN, the AMF may decide a second allowed NSSAI based on the information received from the (R)AN, the UE subscription information and/or local configuration information in AMF, wherein the second allowed NSSAI may be the same as or different from the first allowed NSSAI. The AMF may select/determine a PCF based on the information received from the (R)AN and/or second allowed NSSAI. The AMF may send to a PCF a second message (e.g. policy association establishment request) for the UE comprising one or more of the following information elements: an information element indicating the second allowed NSSAI for the at least one restricted local operator service; an information element indicating a data network name (DNN) for the at least one restricted local operator service; and an information element indicating the at least one restricted local operator service.

In response to the second message received from the AMF, based on the restricted local operator service information received from the NF (e.g. via the message received from the NF) and/or the second allowed NSSAI received from the AMF (via the second message), the PCF may determine one or more access and mobility management policies for the at least one restricted local operator service for the UE. The access and mobility management policies may comprise at least one of: an information element indicating a user equipment (UE) access selection policy for the at least one restricted local operator service; an information element indicating a packet data unit (PDU) session selection policy for the at least one restricted local operator service; or an information element indicating allowed PDU session type(s) for the at least one restricted local operator service. As an example, the PDU session selection policy may indicate allowed PDU session type(s) for the at least one restricted local operator service. As an example, the allowed PDU session types may indicate IPv4, IPv6, IPv4v6, Ethernet or Unstructured PDU session type used for the at least one restricted local operator service.

The PCF may send to the AMF a third message (e.g. policy association establishment response) comprising one or more of: the one or more access and mobility management policies; and the restricted local operator service information.

In response to the message received from the PCF, the AMF may send to UE a registration accept message indicating that the registration request has been accepted. The registration accept message may comprise one or more of: the one or more access and mobility management policies; the restricted local operator service information; the second allowed NSSAI for the at least one restricted local operator service; mapping of allowed NSSAI; the configured NSSAI for the serving PLMN; mapping of configured NSSAI; 5G-GUTI; registration area; mobility restrictions; PDU session status; IMS voice over PS session supported Indication; emergency service support indicator; accepted DRX parameters; and network support of interworking without N26.

In response to the registration accept message received from the AMF, the UE may send to the AMF a registration complete message.

As an example, the UE may enforce the access selection policy(s), for example by selecting a WLAN access network for at least one of the restricted local operator services.

As an example, the UE may enforce the PDU session selection policy(s) by determining how to route the traffic for the at least one of the restricted local operator services. Based on the policy, the traffic may be routed to an established PDU session or offloaded to non-3GPP access outside a PDU Session.

As an example, based on the allowed PDU session type(s), the UE may initiate a PDU session establishment procedure indicating an IPv4, IPv6, IPv4v6, Ethernet or Unstructured PDU session type for the at least one restricted local operator service.

As an example, based on the restricted local operator service information, the UE may send to the (R)AN, a request message comprising a restricted service type, the message indicating at least one of: a service request; or a PDU session establishment request. The (R)AN may send to UE a response message in response to the request message.

Figure 18:
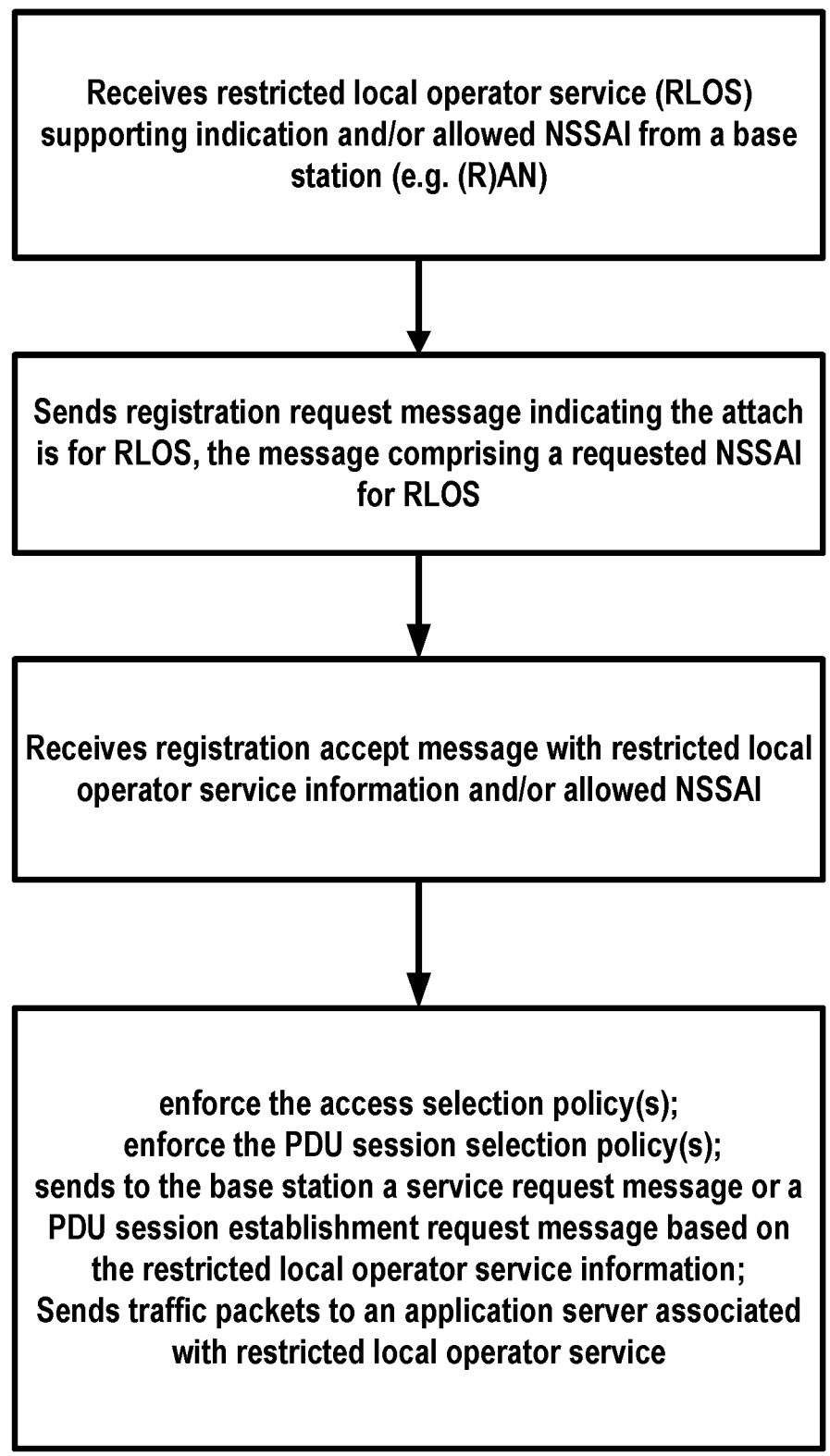
FIG. 18 is an example diagram depicting the procedures of UE as per an aspect of an embodiment of the present disclosure.

As an example, the UE may access an application server the at least one of the restricted local operator services through a UPF. As an example, the UE may send traffic packet to an application server for restricted local operator service (e.g. VoLTE). FIG. 18 is an example diagram depicting the procedures of UE as per an aspect of an embodiment of the present disclosure.

In an example, a UE may initiate a PDU session establishment request procedure. A PCF may receive restricted local operator service information from a network function and may receive policy establishment request with restricted service type and/or allowed NSSAI from an SMF. The PCF may make policy and charging rules for the restricted local operator service(s) based on the information received. The PCF may send to the SMF one or more policy and charging rules for the restricted local operator service comprising restricted local operator service information, the SMF may send the policy and charging rule(s) to a UPF for enforcement, and the SMF may send the restricted local operator service information to UE through AMF.

Figure 19:
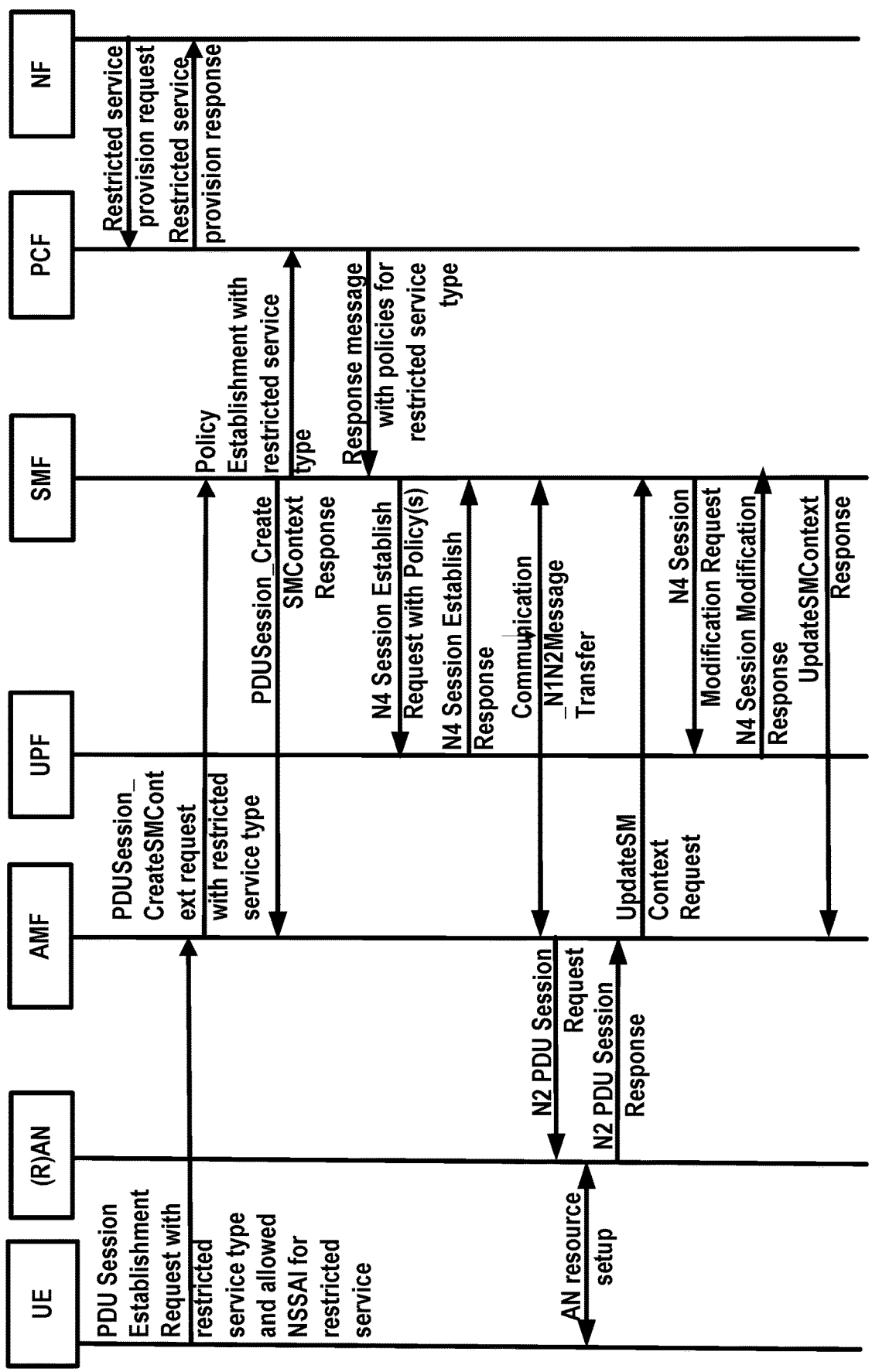
FIG. 19 is an example call flow diagrams of UE requested PDU session establishment procedure as per an aspect of an embodiment of the present disclosure.

FIG. 19 shows an example call flow which may comprise one or more actions. In an example, a PCF may receive from a network function (NF) a message (e.g. a restricted service provision request) comprising at least one of: an information element indicating restricted local operator service information applied to any wireless device that may request restricted local operator service and/or any wireless device which is unauthenticated in a PLMN; an information element indicating an DNN (e.g. RLOS DNN) (e.g. the DNN is associated with the restricted local operator service information); an information element indicating an NSSAI and/or a network slice instance identifier, for example, the restricted local operator service information is applied to one or more network slices of network slice(s) of the NSSAI and/or the network slice instance(s) of the network slice instance identifier. The NSSAI may be a configured NSSAI, a requested NSSAI or an allowed NSSAI. The network function may comprise an application function (AF), an application server (AS), operations administration maintenance (OAM), and/or the like. The restricted local operator service information may comprise at least one of: an information element indicating a service type of one of the at least one restricted local operator service, an information element indicating application information associated with the service type, and/or the like. The application information may comprise a service data flow filter, an application identifier, a uniform resource locator (URL), and/or the like. As an example, the restricted service provision request message may be used to provide new restricted local operator service information or to update an existing restricted local operator service information.

In response to the message received from the NF, the PCF may send to the NF a response message (e.g. a restricted service provision response message).

A UE may send to an AMF a NAS message comprising at least one of: PDU Session ID, Request type, and/or N1 SM container (PDU session establishment request).

The UE 100 may initiate a UE requested PDU session establishment procedure by the transmission of a NAS message comprising a PDU session establishment request message within the N1 SM container. The PDU session establishment request message may comprise a PDU Type (e.g. IPv4), SSC mode, protocol configuration options, and/or a PDU session ID generated by the UE.

NAS Message and/or N1 SM container may comprise one or more of: an information element indicating a restricted service type (e.g. a restricted service type for emergency call) for at least one of the restricted local operator services; an information element indicating an allowed NSSAI for the at least one of the restricted local operator services, as an example, the allowed NSSAI may comprise one or more of S-NSSAIs; an information element indicating a DNN for the at least one of the restricted local operator services (e.g. RLOS DNN); and an information element indicating one or more identifiers of the UE, e.g. IMSI, 5G-GUTI, IMEI, and/or the like.

In response to the message received from the UE, the AMF may select an SMF based on the information received from the UE (e.g. the restricted service type, the allowed NSSAI for the at least one of the restricted local operator services, and/or the DNN for the at least one of the restricted local operator services). The AMF may send to the SMF a message (e.g. PDUSession_CreateSMContext Request) comprising at least one of: SUPI, PDU Session ID, AMF ID, Request Type, N1 SM container (PDU Session Establishment Request), User location information, Access Type, PEI).

The message sent to the SMF may comprise one or more of: an information element indicating a restricted service type (e.g. a restricted service type for emergency call) for the at least one of the restricted local operator services; an information element indicating an allowed NSSAI for the at least one of the restricted local operator services, as an example, the allowed NSSAI may comprise one or more of S-NSSAIs; an information element indicating a DNN for the at least one of the restricted local operator services (e.g. RLOS DNN); and an information element indicating one or more identifiers of the UE, e.g. IMSI, 5G-GUTI, IMEI, and/or the like.

In response to the message received from the AMF, the SMF may send to the AMF a response message (e.g. PDUSession_CreateSMContext Response) comprising one or more of: Cause, SM Context ID or N1 SM container (PDU Session Reject (Cause)).

In response to the message received from the AMF, the SMF may send to a PCF a message (e.g. session management policy establishment) to establish a PDU session with the PCF and get the default PCC Rules for the PDU session. The message sent to PCF may comprise one or more of: an information element indicating a restricted service type (e.g. a restricted service type for emergency call) for the at least one of the restricted local operator services; an information element indicating an allowed NSSAI for the at least one of the restricted local operator services, as an example, the allowed NSSAI may comprise one or more of S-NSSAIs; an information element indicating a DNN for the at least one of the restricted local operator services (e.g. RLOS DNN); and an information element indicating one or more identifiers of the UE, e.g. IMSI, 5G-GUTI, IMEI, and/or the like.

In response to the message received from the SMF, the PCF may make policy decision based on the information received from the NF (e.g. the restricted local operator service information) and/or the information received from the SMF (e.g. restricted service type, allowed NSSAI and/or DNN). The PCF may make one or more of the following policy and charging rules applied to the at least one of the restricted local operator services for the UE: a redirect policy, the redirect policy may be used to redirect the UE traffic to a redirect server address. As an example, the redirect server address comprised in the redirect policy may be at least one of: an IPv4 address, IPv6 Prefix, URL, or FQDN. As an example, the redirect policy may be used to redirect the user traffic to a web portal of the operator; a gating policy, as an example, the gating policy may be used to block the user traffic which is not the restricted local operator service; QoS policy and/or charging policy applied to the at least one of the restricted local operator services.

The PCF may send to the SMF a message (e.g. session management policy response) comprising one or more of information elements applied to the at least one of the restricted local operator services for the UE: an information element indicating the policy and charging rules; an information element indicating the restricted local operator service information; an information element indicating the allowed NSSAI; an information element indicating the DNN; and an information element indicating one or more identifiers of the UE, e.g. IMSI, 5G-GUTI, IMEI, and/or the like.

In response to the message received from the PCF, the SMF may select an UPF based on the restricted service type, as an example, the SMF may select an UPF dedicated for the restricted service type. The SMF may send to the selected UPF a message (e.g. N4 session establishment/modification request) to establish/modify the user plane session. The message may comprise the policy and charging rules (e.g. redirect policy, gating policy) applied to the at least one of the restricted local operator services for the wireless device.

In response to the message received from the SMF, the UPF may send to the SMF a response message (e.g. N4 session establishment/modification response).

The SMF and/or UPF may enforce the received policy and charging rules. As an example, the SMF may send the charging information to the charging system (e.g. online and/or offline charging system). As an example, the UPF may redirect the traffic to a web portal of the operator. As an example, the UPF may discard the user packet which does not match the at least one of the restricted local operator services.

The SMF may send to the AMF a Communication_N1N2MessageTransfer message comprising one or more of: PDU session ID, access type, N2 SM information (PDU session ID, QFI(s), QoS Profile(s), CN Tunnel Info, S-NSSAI from the Allowed NSSAI for the at least one of the restricted local operator services, Session-AMBR, PDU Session Type, User Plane Policy Enforcement), N1 SM container (PDU session establishment accept (QoS Rule(s), selected SSC mode, S-NSSAI(s), DNN, allocated IPv4 address, interface identifier, Session-AMBR, selected PDU Session Type, Reflective QoS Timer (if available), P-CSCF address(es))). The message sent to the AMF may comprise an information element indicating the restricted local operator service information.

In response to the message received from the SMF, the AMF may send to (R)AN an N2 PDU session request message comprising N2 SM information, and/or NAS message, and the NAS message may comprise at least one of: PDU Session ID, and/or N1 SM container (PDU session establishment accept). The message sent to the (R)AN may comprise an information element indicating the restricted local operator service information.

In response to the message received from the AMF, the (R)AN may send to UE AN specific signaling that is related with the information received from SMF. (R)AN may allocate (R)AN N3 tunnel information for the PDU Session. (R)AN may forward to the UE the NAS message (PDU Session ID, N1 SM container (PDU Session Establishment Accept)). The message sent to the UE may comprise an information element indicating the restricted local operator service information.

The (R)AN may send to the AMF an N2 PDU session response message comprising at least one of: PDU Session ID, cause, and/or N2 SM information (PDU Session ID, (R)AN Tunnel Info, list of accepted/rejected QoS profile(s)). The (R)AN Tunnel Info corresponds to the Access Network address of the N3 tunnel corresponding to the PDU Session.

In response to the message received from the (R)AN, the AMF may send to the SMF a UpdateSMContext Request (N2 SM information, request type). The AMF may forward the N2 SM information received from (R)AN to the SMF.

In response to the message received from the AMF, the SMF may send to the UPF a message (e.g. N4 session establishment/modification request) comprising one or more of: the policy and charging rules, AN Tunnel Info and CN Tunnel Info.

In response to the message received from the SMF, the UPF may send an N4 session establishment/modification response to the SMF. The UPF may enforce the policy and charging rules received from the SMF.

Figure 20:
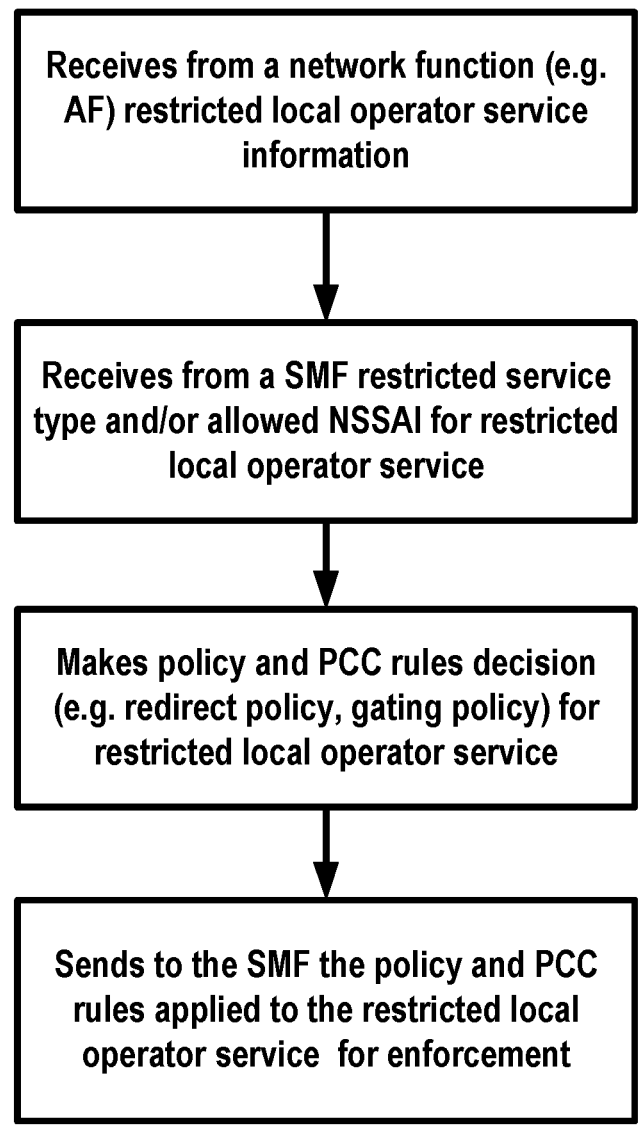
FIG. 20 is an example diagram depicting a PCF procedure as per an aspect of an embodiment of the present disclosure.
Figure 21:
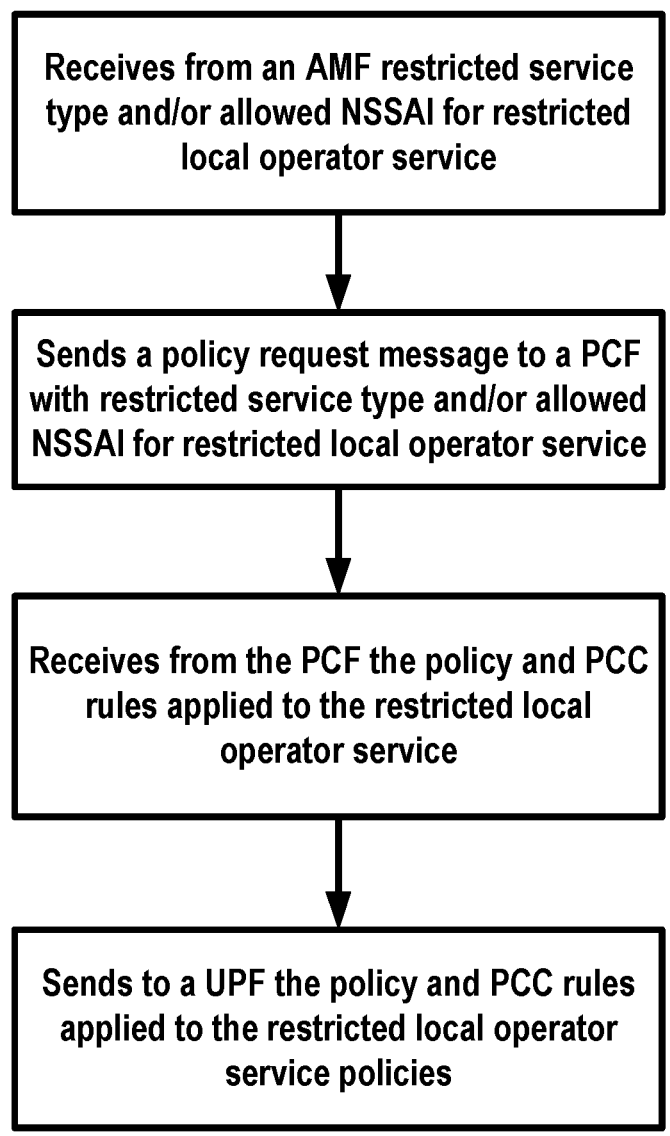
FIG. 21 is an example diagram depicting a SMF procedure as per an aspect of an embodiment of the present disclosure.

In response to the message received from the AMF, the SMF may send to the AMF a UpdateSMContext Response (cause) message. FIG. 20 is an example diagram depicting a PCF procedure as per an aspect of an embodiment of the present disclosure. FIG. 21 is an example diagram depicting a SMF procedure as per an aspect of an embodiment of the present disclosure.

As an example, the UE may access an application server the at least one of the restricted local operator services through a UPF. As an example, the UE may send traffic packet to an application server for restricted local operator service (e.g. VoLTE).

As an example, based on the restricted local operator service information, the UE may send to the (R)AN, a request message comprising the restricted service type, the message indicating at least one of: a service request; or a PDU session establishment request. The (R)AN may send to UE a response message in response to the request message.

In an example, a UE may initiate a service request procedure. A PCF may receive restricted local operator service information from a network function. The PCF may policy modification request with restricted service type and/or allowed NSSAI from an SMF. The PCF may make policy and charging rules for the restricted local operator service(s) based on the information received. The PCF may send to the SMF one or more policy and charging rules for the restricted local operator service comprising restricted local operator service information, the SMF may send the policy and charging rule(s) to a UPF for enforcement, and the SMF may send the restricted local operator service information to UE through AMF.

Figure 22:
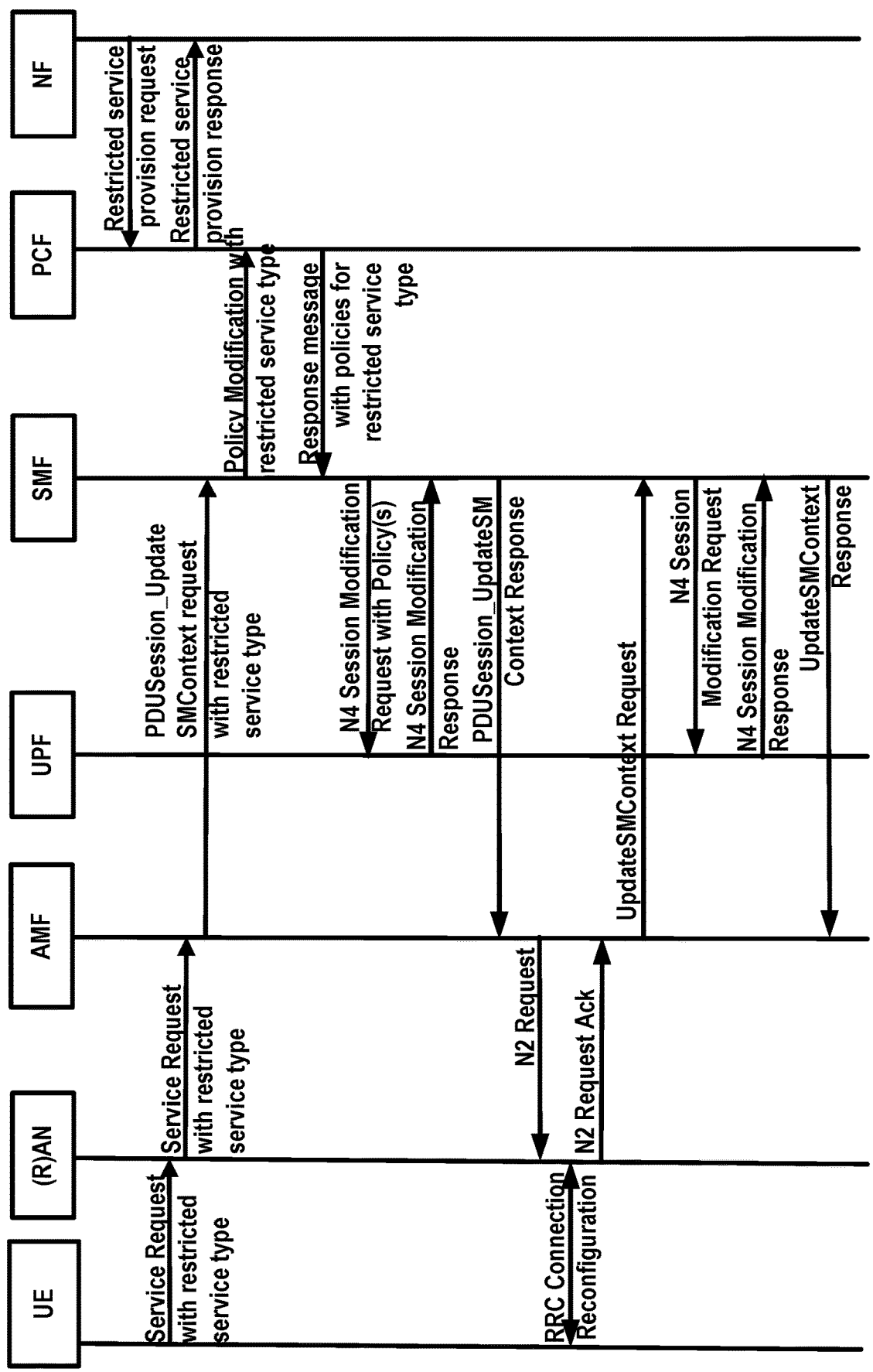
FIG. 22 is an example call flow diagram of UE triggered service request procedure as per an aspect of an embodiment of the present disclosure.

FIG. 22 shows an example call flow which may comprise one or more actions. In an example, a PCF may receive from a network function (NF) a message (e.g. a restricted service provision request) comprising at least one of: an information element indicating restricted local operator service information applied to any wireless device that may request restricted local operator service and/or any wireless device which is unauthenticated in a PLMN; an information element indicating an DNN (e.g. RLOS DNN) (e.g. the DNN is associated with the restricted local operator service information); an information element indicating an NSSAI and/or a network slice instance identifier, for example, the restricted local operator service information is applied to one or more network slices of network slice(s) of the NSSAI and/or the network slice instance(s) of the network slice instance identifier. The NSSAI may be a configured NSSAI, a requested NSSAI or an allowed NSSAI. The network function may comprise an application function (AF), an application server (AS), operations administration maintenance (OAM), and/or the like. The restricted local operator service information may comprise at least one of: an information element indicating a service type of one of the at least one restricted local operator service, an information element indicating application information associated with the service type, and/or the like. The application information may comprise a service data flow filter, an application identifier, a uniform resource locator (URL), and/or the like. As an example, the restricted service provision request message may be used to provide new restricted local operator service information or to update an existing restricted local operator service information.

In response to the message received from the NF, the PCF may send to the NF a response message (e.g. a restricted service provision response message).

A UE may send to a (R)AN an AN message comprising at least one of: AN parameters, and/or service request message, where the service request message may comprise one or more of: list of PDU sessions to be activated, list of allowed PDU sessions, security parameters, PDU session status. The UE may send NAS service request message towards the AMF encapsulated in an RRC message to the RAN, and the RRC message(s) may be used to carry the 5G-GUTI and this NAS message.

The message sent to (R)AN may comprise one or more of: an information element indicating a restricted service type (e.g. a restricted service type for emergency call) for at least one of the restricted local operator services; an information element indicating an allowed NSSAI for the at least one of the restricted local operator services, as an example, the allowed NSSAI may comprise one or more of S-NSSAIs; an information element indicating a DNN for the at least one of the restricted local operator services (e.g. RLOS DNN); and an information element indicating one or more identifiers of the UE, e.g. IMSI, 5G-GUTI, IMEI, and/or the like.

In response to the message received from the UE, the (R)AN may send to an AMF an N2 Message comprising one or more of: N2 parameters and/or service request message. When NG-RAN is used, the N2 parameters may comprise the 5G-GUTI, Location information, RAT type and Establishment cause.

Based on the PDU Session status, the AMF 155 may initiate PDU Session release procedure for the PDU Sessions whose PDU Session ID(s) were indicated by the UE as not available. The message sent to the AMF may comprise one or more of: an information element indicating a restricted service type (e.g. a restricted service type for emergency call) for the at least one of the restricted local operator services; an information element indicating an allowed NSSAI for the at least one of the restricted local operator services, as an example, the allowed NSSAI may comprise one or more of S-NSSAIs; an information element indicating a DNN for the at least one of the restricted local operator services (e.g. RLOS DNN); and an information element indicating one or more identifiers of the UE, e.g. IMSI, 5G-GUTI, IMEI, and/or the like.

In response to the message received from the (R)AN, the AMF may send to an SMF a PDUSession_UpdateSMContext Request message comprising at least one of: PDU session ID(s), cause(s), UE location information, and access type. The message send to the SMF may comprise one or more of: an information element indicating a restricted service type (e.g. a restricted service type for emergency call) for the at least one of the restricted local operator services; an information element indicating an allowed NSSAI for the at least one of the restricted local operator services, as an example, the allowed NSSAI may comprise one or more of S-NSSAIs; an information element indicating a DNN for the at least one of the restricted local operator services (e.g. RLOS DNN); and an information element indicating one or more identifiers of the UE, e.g. IMSI, 5G-GUTI, IMEI, and/or the like.

In response to the message received from the AMF, the SMF may send to a PCF an Nsmf_PDUSession_UpdateSMContext Request message to get the policy and charging rules. The message sent to PCF may comprise one or more of: an information element indicating a restricted service type (e.g. a restricted service type for emergency call) for the at least one of the restricted local operator services; an information element indicating an allowed NSSAI for the at least one of the restricted local operator services, as an example, the allowed NSSAI may comprise one or more of S-NSSAIs; an information element indicating a DNN for the at least one of the restricted local operator services (e.g. RLOS DNN); and an information element indicating one or more identifiers of the UE, e.g. IMSI, 5G-GUTI, IMEI, and/or the like.

In response to the message received from the SMF, the PCF may make policy decision based on the information received from the NF (e.g. the restricted local operator service information) and/or the information received from the SMF (e.g. restricted service type, allowed NSSAI and/or DNN). The PCF may make one or more of the following policy and charging rules applied to the at least one of the restricted local operator services for the UE: a redirect policy, the redirect policy may be used to redirect the UE traffic to a redirect server address. As an example, the redirect server address comprised in the redirect policy may be at least one of: an IPv4 address, IPv6 Prefix, URL, or FQDN. As an example, the redirect policy may be used to redirect the user traffic to a web portal of the operator; a gating policy, as an example, the gating policy may be used to block the user traffic which is not the restricted local operator service; QoS policy and/or charging policy applied to the at least one of the restricted local operator services.

The PCF may send to the SMF a message (e.g. session management policy response) comprising one or more of information elements applied to the at least one of the restricted local operator services for the UE: an information element indicating the policy and charging rules; an information element indicating the restricted local operator service information; an information element indicating the allowed NSSAI; an information element indicating the DNN; and an information element indicating one or more identifiers of the UE, e.g. IMSI, 5G-GUTI, IMEI, and/or the like.

In response to the message received from the PCF, the SMF may use an existing UPF for the PDU session or select a new UPF based on the restricted service type, as an example, the SMF may use an existing UPF dedicated for the restricted service type. The SMF may send to the existing UPF or new selected UPF a message (e.g. N4 session modification/establishment request) to modify/establish the user plane session. The message may comprise the policy and charging rules (e.g. redirect policy, gating policy) applied to the at least one of the restricted local operator services for the wireless device.

In response to the message received from the SMF, the UPF may send to the SMF a response message (e.g. N4 session modification/establishment response).

The SMF and/or UPF may enforce the received policy and charging rules. As an example, the SMF may send the charging information to the charging system (e.g. online and/or offline charging system). As an example, the UPF may redirect the traffic to a web portal of the operator. As an example, the UPF may discard the user packet which does not match the at least one of the restricted local operator services.

In response to the message received from the AMF, the SMF may send to the AMF a PDUSession_UpdateSMContext Response message comprising a N2 SM information message, where the N2 SM information message may comprise one or more of: PDU Session ID, QFI(s), QoS profile (s), and CN N3 Tunnel Info. The message sent to the AMF may comprise an information element indicating the restricted local operator service information.

In response to the message received from the SMF, the AMF may send to (R)AN an N2 request message comprising one or more of: the N2 SM information message received from SMF, security context, AMF Signaling connection ID, subscribed UE-AMBR, MM NAS Service Accept, list of recommended cells/TAs/NG-RAN node identifiers. The message sent to the (R)AN may comprise an information element indicating the restricted local operator service information.

In response to the message received from the AMF, the NG-RAN may perform RRC connection reconfiguration with the UE depending on the QoS information for all the QoS Flows of the PDU sessions whose UP connections are activated and Data Radio Bearers. If the N2 request message includes a NAS message, the NG-RAN may forward the NAS message to the UE. The UE locally deletes context of PDU Sessions that are not available in 5GC. The message sent to the UE may comprise an information element indicating the restricted local operator service information.

The (R)AN may send to the AMF an N2 request ack message comprising an N2 SM information message, where the N2 SM information message may comprise one or more of: AN tunnel info, list of accepted QoS flows for the PDU sessions whose UP connections are activated, list of rejected QoS flows for the PDU Sessions whose UP connections are activated, and PDU Session ID.

In response to the message received from the (R)AN, the AMF may send to the SMF a UpdateSMContext Request comprising the N2 SM information message and RAT type. The AMF may forward the N2 SM information received from (R)AN to the SMF per PDU Session ID.

In response to the message received from the AMF, the SMF may send to the UPF a message (e.g. N4 session establishment/modification request) comprising one or more of: the policy and charging rules, AN Tunnel Info and CN Tunnel Info.

In response to the message received from the SMF, the UPF may send an N4 session establishment/modification response to the SMF. The UPF may enforce the policy and charging rules received from the SMF.

In response to the message received from the AMF, the SMF may send to the AMF a UpdateSMContext Response (cause) message.

As an example, the UE may access an application server the at least one of the restricted local operator services through a UPF. As an example, the UE may send traffic packet to an application server for restricted local operator service (e.g. VoLTE).

As an example, based on the restricted local operator service information, the UE may send to the (R)AN, a request message comprising the restricted service type, the message indicating at least one of: a service request; or a PDU session establishment request. The (R)AN may send to UE a response message in response to the request message.

In an example, a PCF may receive restricted local operator service information from a network function, and the PCF may make policy and charging rules for the restricted local operator service(s) based on the information received. The PCF may send to a SMF one or more policy and charging rules for the restricted local operator service comprising restricted local operator service information, the SMF may enforce the policy and charging rules and send the restricted local operator service information to UE through AMF and (R)AN.

Figure 23:
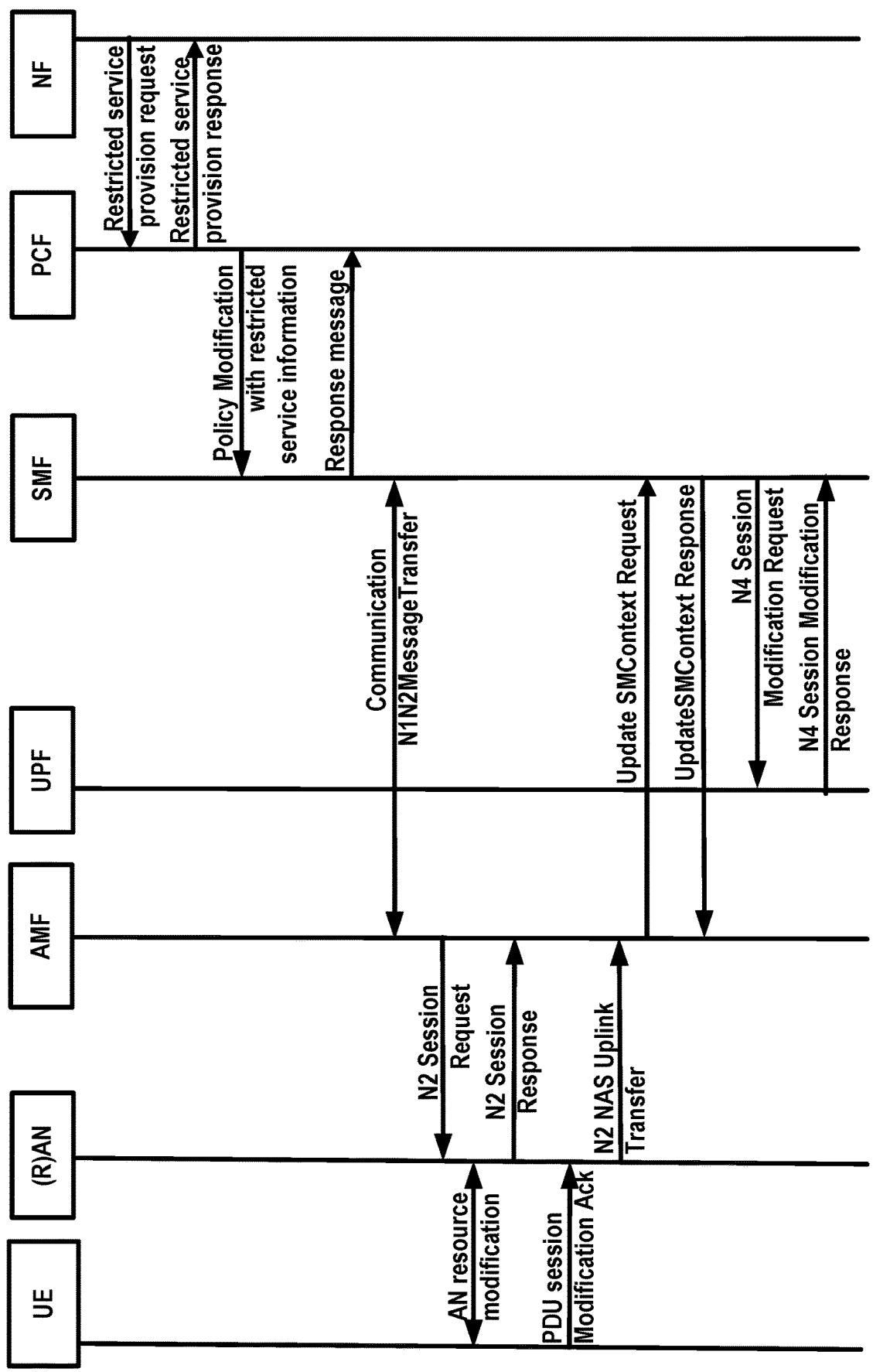
FIG. 23 is an example call flow diagram of NF triggered PDU session modification procedure as per an aspect of an embodiment of the present disclosure.

FIG. 23 shows an example call flow which may comprise one or more actions. In an example, a PCF may receive from a network function (NF) a message (e.g. a restricted service provision request) comprising at least one of: an information element indicating restricted local operator service information applied to any wireless device that may request restricted local operator service and/or any wireless device which is unauthenticated in a PLMN; an information element indicating an DNN (e.g. RLOS DNN) (e.g. the DNN is associated with the restricted local operator service information); an information element indicating an NSSAI and/or a network slice instance identifier, for example, the restricted local operator service information is applied to one or more network slices of network slice(s) of the NSSAI and/or the network slice instance(s) of the network slice instance identifier. The NSSAI may be a configured NSSAI, a requested NSSAI or an allowed NSSAI. The network function may comprise an application function (AF), an application server (AS), operations administration maintenance (OAM), and/or the like. The restricted local operator service information may comprise at least one of: an information element indicating a service type of one of the at least one restricted local operator service, an information element indicating application information associated with the service type, and/or the like. The application information may comprise a service data flow filter, an application identifier, a uniform resource locator (URL), and/or the like. As an example, the restricted service provision request message may be used to provide new restricted local operator service information or to update an existing restricted local operator service information.

In response to the message received from the NF, the PCF may send to the NF a response message (e.g. a restricted service provision response message).

In response to the message received from the NF, the PCF may make policy decision based on the information received from the NF (e.g. the restricted local operator service information) and/or the information received from the SMF (e.g. restricted service type, allowed NSSAI and/or DNN). The PCF may make one or more of the following policy and charging rules applied to at least one of the restricted local operator services for the UE: a redirect policy, the redirect policy may be used to redirect the UE traffic to a redirect server address. As an example, the redirect server address comprised in the redirect policy may be at least one of: an IPv4 address, IPv6 Prefix, URL, or FQDN. As an example, the redirect policy may be used to redirect the user traffic to a web portal of the operator; a gating policy, as an example, the gating policy may be used to block the user traffic which is not the restricted local operator service; QoS policy and/or charging policy applied to the at least one of the restricted local operator services.

The PCF may send to the a SMF a message (e.g. session management policy response) comprising one or more of information elements applied to the at least one of the restricted local operator services for the UE: an information element indicating the policy and charging rules; an information element indicating the restricted local operator service information; an information element indicating the allowed NSSAI; an information element indicating the DNN; and an information element indicating one or more identifiers of the UE, e.g. IMSI, 5G-GUTI, IMEI, and/or the like.

In response to the message received from the PCF, the SMF may send to an AMF a message (e.g. Namf_Communication_N1N2MessageTransfer) comprising one or more of: (N2 SM information (PDU Session ID, QFI(s), QoS Profile(s), Session-AMBR), N1 SM container (PDU Session Modification Command (PDU Session ID, QoS rule(s), QoS rule operation, Session-AMBR))). The message sent to the AMF may comprise an information element indicating the restricted local operator service information.

In response to the message received from the SMF, the AMF may send to a (R)AN a message (e.g. N2 PDU session request), where the N2 PDU session request message may comprise one or more of: N2 SM information received from SMF, NAS message (PDU Session ID, N1 SM container (PDU Session Modification Command)). The message sent to the (R)AN may comprise an information element indicating the restricted local operator service information.

In response to the message received from the AMF, the (R)AN may issue AN specific signalling exchange with the UE that is related with the information received from SMF. For example, in case of a NG-RAN, an RRC Connection Reconfiguration may take place with the UE modifying the necessary (R)AN resources related to the PDU Session. The message sent to the UE may comprise an information element indicating the restricted local operator service information.

The (R)AN may acknowledge N2 PDU session request by sending to the AMF a N2 PDU session ack comprising N2 SM information, where the N2 SM information may comprise one or more of: list of accepted/rejected QFI(s), AN Tunnel Info, PDU Session ID.

The UE may acknowledge the PDU session modification command by sending a NAS message comprising PDU Session ID and N1 SM container, where the N1 SM container may comprise PDU Session Modification Command Ack message.

In response to the message received from the UE, the (R)AN may forward the NAS message to the AMF.

In response to the message received from the (R)AN, the AMF may forward the N2 SM information and/or the N1 SM container (PDU Session Modification Command Ack) received from the (R)AN to the SMF via Nsmf_PDUSession_UpdateSMContext service operation. The SMF may reply with a Nsmf_PDUSession_UpdateSMContext Response.

The SMF may update N4 session of the UPF(s) that are involved by the PDU session modification by sending to the UPF a N4 session modification request message comprising an N4 Session ID and/or policy and charging rules applied to the at least one of the restricted local operator services.

In response to the message received from the SMF, the UPF may send an N4 session modification response to the SMF.

The SMF and/or UPF may enforce the received policy and charging rules. As an example, the SMF may send the charging information to the charging system (e.g. online and/or offline charging system). As an example, the UPF may redirect the traffic to a web portal of the operator. As an example, the UPF may discard the user packet which does not match the at least one of the restricted local operator services.

As an example, the UE may access an application server the at least one of the restricted local operator services through a UPF. As an example, the UE may send traffic packet to an application server for restricted local operator service (e.g. VoLTE).

As an example, based on the restricted local operator service information, the UE may send to the (R)AN, a request message comprising the restricted service type, the message indicating at least one of: a service request; or a PDU session establishment request. The (R)AN may send to UE a response message in response to the request message.

As an example, a policy control function (PCF) may receive from a network function (NF) a first message comprising restricted local operator service information, wherein the restricted local operator service information may comprise at least one of: a first information element indicating a service type of one of at least one restricted local operator service; or a second information element indicating application information associated with the service type.

As an example, the PCF may receive from an access and mobility management function (AMF) a second message indicating a policy association establishment request for a wireless device, wherein the policy association establishment request may comprise an allowed network slice selection assistance information (NSSAI) for the at least one restricted local operator service.

As an example, based on the restricted local operator service information and the allowed NSSAI, the PCF may determine one or more access and mobility management policies of the at least one restricted local operator service for the wireless device.

As an example, the PCF may send to the AMF and in response to the second message, a third message comprising: the one or more access and mobility management policies; and the restricted local operator service information.

As an example, the second message may further comprise at least one of: a third information element indicating a data network name (DNN) for the at least one restricted local operator service; or a fourth information element indicating the at least one restricted local operator service.

As an example, the application information may comprise at least one of: a service data flow filter; an application identifier; or a uniform resource locator (URL).

As an example, the one or more access and mobility management policies may further comprise at least one of: a user equipment (UE) access selection policy for the at least one restricted local operator service; a packet data unit (PDU) session selection policy for the at least one restricted local operator service; or one or more allowed PDU session types for the at least one restricted local operator service.

As an example, the AMF may send to the wireless device a registration accept message comprising the restricted local operator service information.

As an example, a wireless device may receive from a base station, a first message indicating that a network associated with the base station supports a restricted local operator service (RLOS), wherein the first message may comprise a first information element indicating at least one first allowed network slice selection assistance information (NSSAI) for the RLOS.

As an example, the wireless device may send to the base station and based on the first message, a first radio resource control message comprising a registration request message to a core network entity, wherein the registration request message may comprise: a first parameter indicating a request for the RLOS; and a second parameter indicating a requested NSSAI for the RLOS, wherein the requested NSSAI is one of the at least one first allowed NSSAI.

As an example, the wireless device may receive from the base station and in response to the registration request message, a second radio resource control message comprising a registration accept message from the core network entity, wherein the registration accept message may comprise RLOS information comprising at least one of: a second information element indicating a service type of at least one RLOS allowed for the wireless device; or a third information element indicating application information associated with the service type.

As an example, the RLOS information may further comprise a fourth information element indicating at least one second allowed NSSAI for the RLOS.

As an example, the first message further may comprise a fifth information element indicating allowed PDU session type(s) for the RLOS.

As an example, the registration accept message may further comprise a fourth information element indicating one or more access and mobility management policies, wherein the one or more access and mobility management policies may comprise at least one of: a user equipment (UE) access selection policy for the at least one restricted local operator service; a packet data unit (PDU) session selection policy for the at least one restricted local operator service; or allowed PDU session type(s) for the at least one restricted local operator service.

As an example, the wireless device may select an access network based on the one or more access and mobility management policies.

As an example, based on the restricted local operator service information, the wireless device may send to the base station, a third message comprising a restricted service type, the third message indicating at least one of: a service request; or a packet data unit (PDU) session establishment request.

As an example, the wireless device may receive from the base station, a response message for the third message.

As an example, based on the response message, the wireless device may send to the base station one or more packets associated with the at least one restricted local operator service.

As an example, the application information may comprise at least one of: a service data flow filter; an application identifier; or a uniform resource locator (URL).

As an example, the first message may comprise a system information block.

As an example, the first radio resource control message may comprise at least one of: a radio resource control connection setup complete message; or a radio resource control connection request message.

As an example, based on the first message, the wireless device may transmit to the base station, a random access preamble for initiation of a random access procedure associated with the attach request.

As an example, the wireless device may receive from the base station and in response to the random access preamble, a random access response for the random access procedure.

As an example, the wireless device may transmit to the base station, a radio resource control connection request message indicating a request of a radio resource control connection with the base station, wherein the radio resource control connection request message may comprise at least one of: a connection establishment cause indicating that the radio resource control connection is for the RLOS; or an identifier of the wireless device.

As an example, the wireless device may receive from the base station and in response to the radio resource control connection request message, a radio resource control connection setup message indicating an acceptance of the request of a radio resource control connection; and wherein the wireless device may send the first radio resource control message in response to the radio resource control connection setup message.

As an example, the base station may determine whether accepting the request of a radio resource control connection of the wireless device based on the connection establishment cause.

As an example, a policy control function (PCF) may receive from a network function (NF), a first message comprising restricted local operator service information, wherein the restricted local operator service information may comprise at least one of: a first information element indicating a service type of one of at least one restricted local operator service; or a second information element indicating application information associated with the service type.

As an example, the PCF may receive from a session management function (SMF), a second message indicating a policy establishment request for a wireless device, wherein the policy establishment request may comprise at least one of: a restricted service type for the at least one restricted local operator service; or an allowed NSSAI for the at least one restricted local operator service.

As an example, based on the restricted local operator service information, the PCF may determine the restricted service type, and the allowed NSSAI, one or more policy and charging rules of the at least one restricted local operator service for the wireless device.

As an example, in response to the second message, the PCF may send to the SMF, a third message comprising at least one of: the one or more policy and charging rules; the restricted local operator service information; or the allowed NSSAI.

As an example, the application information may comprise at least one of: a service data flow filter; an application identifier; or a uniform resource locator (URL).

As an example, the one or more policy and charging rules may further comprise at least one of: a fifth information element indicating a redirect policy; a sixth information element indicating a gating policy; a seventh information element indicating a quality of service (QoS) policy; or an eighth information element indicating a charging policy.

As an example, the SMF may send to a user plane function (UPF), a request message comprising the one or more policy and charging rules.

As an example, a policy control function (PCF) may receive from a network function (NF), a first message comprising restricted local operator service information, wherein the restricted local operator service information may comprises at least one of: a first information element indicating a service type of one of at least one restricted local operator service; or a second information element indicating application information associated with the service type.

As an example, the PCF may receive from a session management function (SMF), a second message indicating a policy modification request for a wireless device, wherein the policy modification request may comprise at least one of: a restricted service type for the at least one restricted local operator service; or an allowed NSSAI for the at least one restricted local operator service.

As an example, the PCF may base on the restricted local operator service information, the restricted service type, and the allowed NSSAI determine one or more policy and charging rules of the at least one restricted local operator service for a wireless device.

As an example, in response to the second message, the PCF may send to the SMF, a third message comprising at least one of: the one or more policy and charging rules; the restricted local operator service information; or the allowed NSSAI.

As an example, a policy control function (PCF) may receive, from a network function (NF), a first message comprising restricted local operator service information, wherein the restricted local operator service information may comprise at least one of: a first information element indicating a service type of one of at least one restricted local operator service; or a second information element indicating application information associated with the service type.

As an example, the PCF may determine one or more policy and charging rules of the at least one restricted local operator service for a wireless device base on the restricted local operator service information.

As an example, the PCF may send, to a SMF, a second message indicating a policy modification for the wireless device, wherein the second message comprises at least one of: the one or more policy and charging rules; the restricted local operator service information; or an allowed NSSAI.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 25:
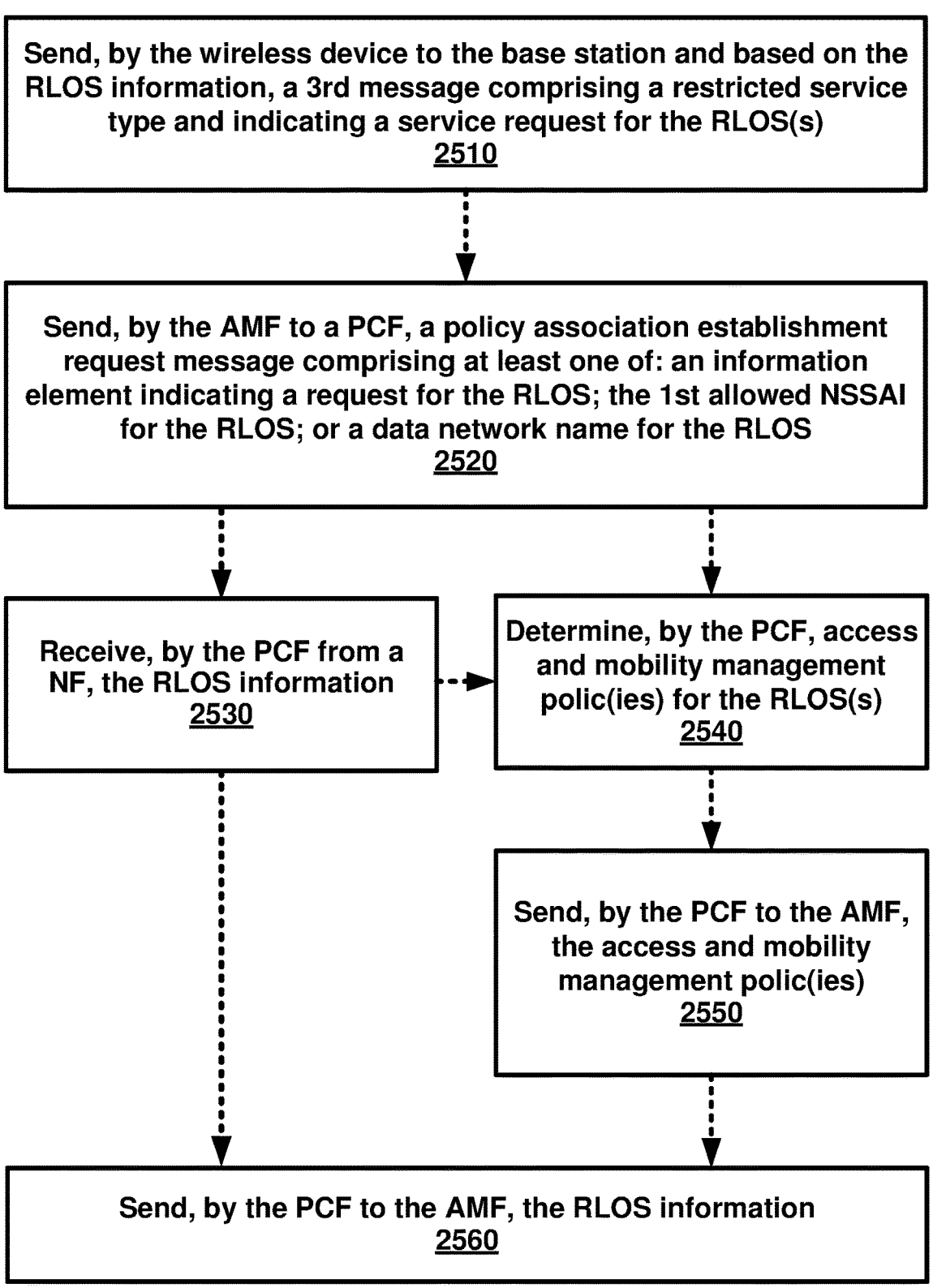
FIG. 25 is a flow diagram of aspects of embodiments of the present disclosure.

FIG. 24 and FIG. 25 are example flow diagrams as per aspects embodiments of the present disclosure. At 2410, a wireless device may send a first radio resource control (RRC) message to a base station. The first RRC message may comprise a registration request message for an access and mobility management function (AMF). The registration request message may comprise a first parameter indicating a request for restricted local operator services (RLOS). The registration request message may comprise a second parameter indicating a requested network slice selection assistance information (NSSAI) for the RLOS. The requested NSSAI may comprise at least one first allowed NSSAI. At 2420, the wireless device may receive a second RRC message from the base station. The second RRC message may comprise a registration accept message from the AMF. The registration accept message may comprise RLOS information and a second allowed NSSAI for at least one RLOS allowed for the wireless device. The RLOS information may comprise a service type of the at least one RLOS allowed for the wireless device. At 2430, the wireless device may send to the base station, one or more packets of the at least one RLOS allowed for the wireless device.

According to an example embodiment, the at least one RLOS allowed for the wireless device may comprise a voice over long term evolution (VOLTE) service. According to an example embodiment, at 2410, the AMF may determine the at least one first allowed NSSAI for the RLOS based on the requested NSSAI received from the wireless device. According to an example embodiment, the wireless device may receive a first message from the base station. The first message may indicate that a network supports the RLOS. The first message may comprise a first information element may indicate the at least one first allowed NSSAI for the RLOS. According to an example embodiment, the first message may comprise an allowed packet data unit (PDU) session type for the RLOS. According to an example embodiment, the second allowed NSSAI may be determined by the AMF based on the requested NSSAI. According to an example embodiment, the second allowed NSSAI may be the same as the at least one first allowed NSSAI. According to an example embodiment, the registration accept message may comprise one or more access and mobility management policies. According to an example embodiment, the one or more access and mobility management policies may comprise a user equipment (UE) access selection policy for the at least one RLOS. According to an example embodiment, the one or more access and mobility management policies may comprise a packet data unit (PDU) session selection policy for the at least one RLOS. According to an example embodiment, the one or more access and mobility management policies may comprise allowed PDU session type(s) for the at least one RLOS. According to an example embodiment, the wireless device may select an access network based on the one or more access and mobility management policies. According to an example embodiment, the RLOS information may indicate application information associated with the service type. According to an example embodiment, the application information may comprise a service data flow filter. According to an example embodiment, the application information may comprise an application identifier. According to an example embodiment, the application information may comprise a uniform resource locator (URL).

According to an example embodiment, at 2510, the wireless device may send a third message to the base station based on the RLOS information. The third message may comprise a restricted service type and may indicate a service request for the at least one RLOS. According to an example embodiment, at 2520, the AMF may send a policy association establishment request message to a policy control function (PCF). The policy association establishment request message may comprise an information element indicating a request for the RLOS. The policy association establishment request message may comprise the first allowed NSSAI for the RLOS. The policy association establishment request message may comprise a data network name for the RLOS. According to an example embodiment, at 2530, the PCF may receive the RLOS information from a network function (NF). According to an example embodiment, at 2540, the PCF may determine one or more access and mobility management policies for the at least one RLOS. According to an example embodiment, the determination may be based on the RLOS information received from a network function (NF). According to an example embodiment, the determination may be based on the first allowed NSSAI for the RLOS. According to an example embodiment, at 2550, the PCF, may send the one or more access and mobility management policies to the AMF. According to an example embodiment, at 2560, the PCF may send the RLOS information to the AMF.

FIG. 26 is an example flow diagram as per aspects of an embodiment of the present disclosure. At 2610, a wireless device may send a first radio resource control (RRC) message to a base station. The first RRC message may comprise a registration request message for an access and mobility management function (AMF). The registration request message may comprise a parameter indicating a request for restricted local operator services (RLOS). At 2620, the wireless device may receive a second RRC message from the base station. The second RRC message may comprise a registration accept message from the AMF. The registration accept message may comprise RLOS information. The registration accept message may comprise an allowed packet data unit (PDU) session type for the RLOS. The RLOS information may indicate a service type of at least one RLOS allowed for the wireless device. At 2630, the wireless device may initiate, based on the RLOS information, a PDU session establishment procedure. The PDU session establishment procedure may indicate the allowed PDU session type for the at least one RLOS.

Figure 27:
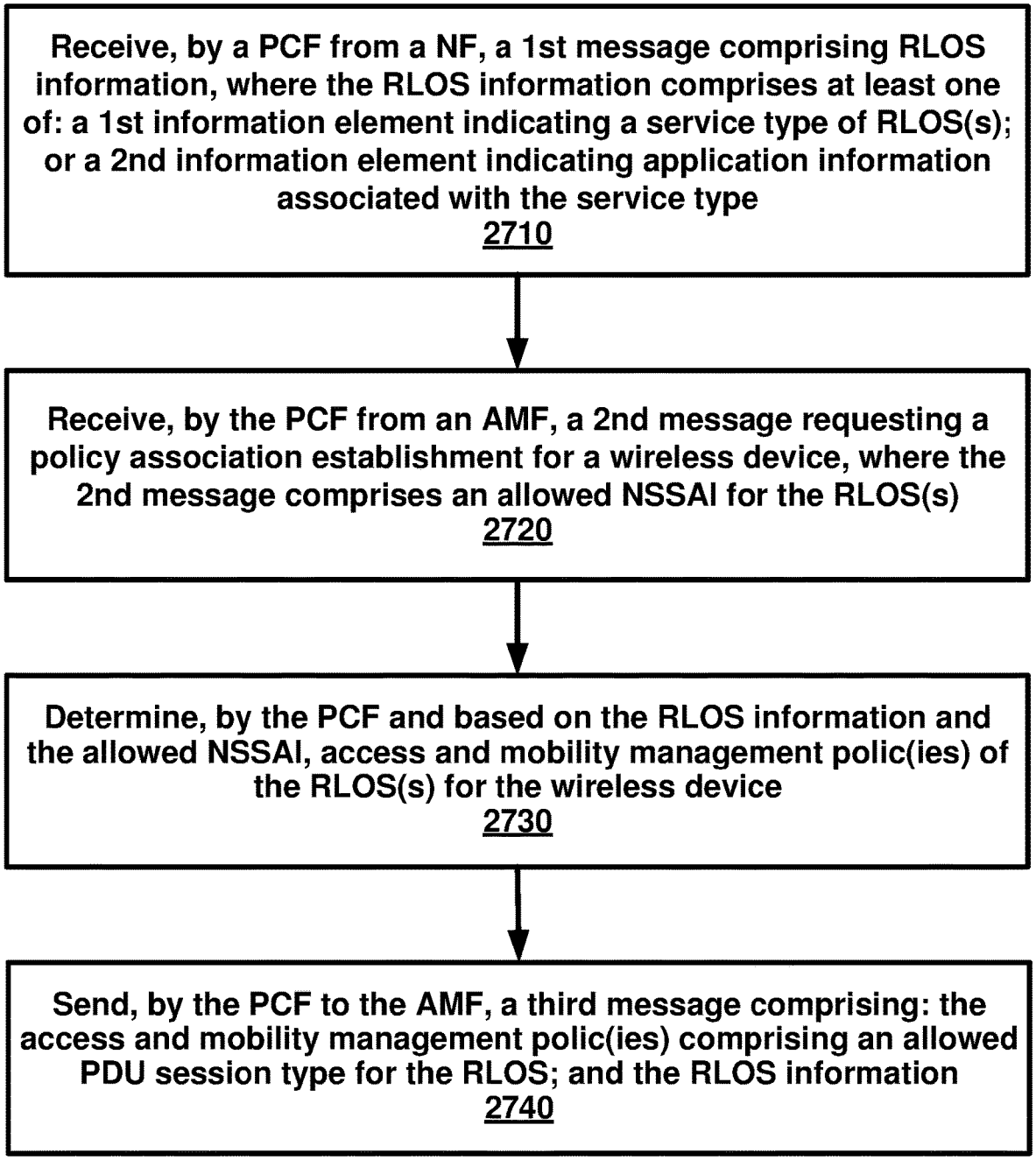
FIG. 27 is a flow diagram of aspects of embodiments of the present disclosure.

FIG. 27 is an example flow diagram as per aspects of an embodiment of the present disclosure. At 2710, a policy control function (PCF) may receive a first message from a network function (NF). The first message may comprise restricted local operator service (RLOS) information. The RLOS information may comprise a first information element may indicate a service type of at least one RLOS. The RLOS information may comprise a second information element. The second information element may indicate application information associated with the service type. At 2720, the PCF may receive a second message from an access and mobility management function (AMF). The second message may request a policy association establishment for a wireless device. The second message may comprise an allowed network slice selection assistance information (NSSAI) for the at least one RLOS. At 2730, the PCF may determine, based on the RLOS information and the allowed NSSAI, one or more access and mobility management policies of the at least one RLOS for the wireless device. At 2740, the PCF may send a third message to the AMF. The third message may comprise the one or more access and mobility management policies. The one or more access and mobility management policies may comprise an allowed PDU session type for the RLOS. The third message may comprise the RLOS information.

FIG. 28 is an example flow diagram as per aspects of an embodiment of the present disclosure. At 2810, an access and mobility management function (AMF) may receive a registration request message from a wireless device via a base station. The registration request message may comprise a first parameter. The first parameter may indicate a request for restricted local operator service (RLOS). The registration request message may comprise a second parameter. The Second parameter may indicate a requested network slice selection assistance information (NSSAI) for the RLOS. The requested NSSAI may comprise at least one first allowed NSSAI. At 2820, the AMF may determine, based on the request for the RLOS and the requested NSSAI for the RLOS, a second allowed NSSAI for the RLOS. At 2830, the AMF may send a policy association establishment message to a policy control function (PCF). The policy association establishment message for the wireless device may comprise the second allowed NSSAI. At 2840, the AMF may receive a response message from the PCF. The response message may comprise one or more access and mobility management policies. The one or more access and mobility management policies may comprise an allowed PDU session type for the RLOS. The response message may comprise RLOS information. At 2850, the AMF may send a registration accept message to the wireless device. The registration accept message may comprise the one or more access and mobility management policies and the RLOS information.

FIG. 29 is an example flow diagram as per aspects of an embodiment of the present disclosure. At 2910, a wireless device may receive a system information block from a base station of a network. The system information block may indicate that the network supports restricted local operator services (RLOS). At 2920, the wireless device may send a radio resource control connection (RRC) connection request message to the base station. The RRC connection request message may indicate a request for an RRC connection with the base station. The RRC connection request message may comprise an establishment cause indicating that the RRC connection is for the RLOS. At 2930, the wireless device may receive an RRC connection setup message in response to the RRC connection request message. The RRC connection setup message may indicate an acceptance of the request for the RRC connection for the RLOS. At 2940, the wireless device may send, a first RRC message in response to the RRC connection setup message.

FIG. 30 is an example flow diagram as per aspects of an embodiment of the present disclosure. At 3010, a policy control function (PCF) may receive a first message from a network function (NF). The first message may comprise restricted local operator service information. The restricted local operator service (RLOS) information may comprise a first information element indicating a service type of at least one RLOS. The restricted local operator service (RLOS) information may comprise a second information element indicating application information associated with the service type. At 3020, the PCF may receive a second message from a session management function (SMF). The second message may indicate a policy establishment request for a wireless device. The policy establishment request may comprise a restricted service type for the at least one RLOS. The policy establishment request may comprise an allowed requested network slice selection assistance information (NSSAI) for the at least one RLOS. At 3030, the PCF may determine, based on the RLOS information, the restricted service type. The PCF may determine, based on the RLOS information, the allowed NSSAI. The PCF may determine, based on the RLOS information, one or more policy and charging rules of the at least one RLOS for the wireless device. At 3040, the PCF may send a third message to the SMF in response to the second message. The third message may comprise the one or more policy and charging rules. The third message may comprise the RLOS information. The third message may comprise the allowed NSSAI.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}.

In this specification, various Examples are disclosed. Limitations, features, and/or elements from the disclosed example Examples may be combined to create further Examples within the scope of the disclosure.

In this specification, various Examples are disclosed. Limitations, features, and/or elements from the disclosed example Examples may be combined to create further Examples within the scope of the disclosure.

In this specification, parameters (Information elements: IEs) may comprise one or more objects, and one of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in one of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (e.g. hardware with a biological element) or a combination thereof, some of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. A limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
sending, by a session management function (SMF) to a policy control function (PCF), a policy request comprising:
a first parameter indicating a restricted service type for restricted local operator services (RLOS), and
a second parameter indicating a network slice selection assistance information (NSSAI) for the RLOS; and
receiving, by the SMF from the PCF, a policy response comprising a policy and charging rule for the RLOS.

2. The method of claim 1, wherein the policy and charging rule is based on the first parameter and the second parameter.

3. The method of claim 1, further comprising sending, by the SMF to a user plane function, the policy and charging rule.

4. The method of claim 1, wherein the policy request is sent responsive to the SMF receiving, from an access and mobility management function (AMF), a packet data unit (PDU) session request message comprising the first parameter and the second parameter.

5. The method of claim 4, wherein the PDU session request message further comprising at least one of:
a third parameter indicating a data network name (DNN) for the RLOS; or
a fourth parameter indicating an identifier of a wireless device.

6. The method of claim 5, wherein the policy request further comprises the third parameter and the fourth parameter.

7. The method of claim 5, wherein the policy and charging rule is further based on the third parameter and the fourth parameter.

8. The method of claim 1, wherein the policy and charging rule for the RLOS comprises at least one of:
a redirect policy;
a gating policy;
a quality of service (QoS) policy; or
a charging policy.

9. The method of claim 1, wherein the policy response further comprises a restricted local operator service information.

10. The method of claim 8, wherein the restricted local operator service information comprises at least one of:
a service type of one of the RLOS; or
application information associated with the service type.

11. The method of claim 1, further comprising selecting, by the SMF and based on the restricted service type, a user plane function.

12. An apparatus comprising:
one or more processors; and
memory storing instructions that, when executed by the one or more processors, cause a session management function (SMF) to perform operations comprising:
sending, to a policy control function (PCF), a policy request comprising:
a first parameter indicating a restricted service type for restricted local operator services (RLOS), and
a second parameter indicating a network slice selection assistance information (NSSAI) for the RLOS; and
receiving, from the PCF, a policy response comprising a policy and charging rule for the RLOS.

13. The apparatus of claim 12, wherein the policy request is sent responsive to the SMF receiving, from an access and mobility management function (AMF), a packet data unit (PDU) session request message comprising the first parameter and the second parameter.

14. The apparatus of claim 13, wherein the PDU session request message further comprising at least one of:
a third parameter indicating a data network name (DNN) for the RLOS; or
a fourth parameter indicating an identifier of a wireless device.

15. The apparatus of claim 14, wherein the policy request further comprises the third parameter and the fourth parameter.

16. The apparatus of claim 14, wherein the policy and charging rule is further based on the third parameter and the fourth parameter.

17. The apparatus of claim 12, wherein the policy and charging rule for the RLOS comprises at least one of:
   a redirect policy;
   a gating policy;
   a quality of service (QoS) policy; or
   a charging policy.

18. The apparatus of claim 12, wherein the policy response further comprises restricted local operator service information.

19. The apparatus of claim 18, wherein the restricted local operator service information comprises at least one of:
   a service type of one of the RLOS; or
   application information associated with the service type.

20. A system comprising:
   a policy control function (PCF); and
   an session management function (SMF) comprising:
      one or more processors; and
      memory storing instructions that, when executed by the one or more processors, cause the SMF to perform operations comprising:
         sending, to the PCF, a policy request comprising:
            a first parameter indicating a restricted service type for restricted local operator services (RLOS), and
            a second parameter indicating a network slice selection assistance information (NSSAI) for the RLOS; and
         receiving, from the PCF, a policy response comprising a policy and charging rule for the RLOS.

* * * * *